United States Patent
Xu et al.

(10) Patent No.: US 12,501,438 B2
(45) Date of Patent: Dec. 16, 2025

(54) TECHNIQUES FOR INDICATING UNUSED CONFIGURED GRANT PUSCH OCCASIONS

(71) Applicant: QUALCOMM Incorporated, San Diego, CA (US)

(72) Inventors: Huilin Xu, Temecula, CA (US); Jing Sun, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 18/168,375

(22) Filed: Feb. 13, 2023

(65) Prior Publication Data
US 2024/0276497 A1    Aug. 15, 2024

(51) Int. Cl.
*H04W 72/02* (2009.01)
*H04W 72/21* (2023.01)

(52) U.S. Cl.
CPC .................................. *H04W 72/21* (2023.01)

(58) Field of Classification Search
CPC . H04W 72/02; H04W 72/04; H04W 72/0446; H04W 72/121; H04W 72/23;
(Continued)

(56) References Cited

U.S. PATENT DOCUMENTS

2024/0276305 A1* 8/2024 Khoshkholgh Dashtaki ............... H04L 1/1664
2024/0406956 A1* 12/2024 Tsai ...................... H04L 1/1812

FOREIGN PATENT DOCUMENTS

WO      2021140351 A1    7/2021
WO      WO-2024165436 A1 *  8/2024  ........ H04W 72/1268
WO      WO-2024168212 A1 *  8/2024  ........... H04L 1/1896

OTHER PUBLICATIONS

Ericsson: "Validation of CG-SDT Occasions", 3GPP TSG-RAN WG2 #118-e, 3GPP Draft, R2-2205597, 3rd Generation Partnership Project, Mobile Competence Centre, 650, Route Des Lucioles, F-06921 Sophia-Antipolis Cedex, France, vol. RAN WG 2, No. Electronic meeting, May 9, 2022-May 20, 2022, Apr. 25, 2022, XP052139092, 3 pages, section 2.1.

(Continued)

*Primary Examiner* — Bo Hui A Zhu
*Assistant Examiner* — Alvin Zhu
(74) *Attorney, Agent, or Firm* — Dalei Dong; Holland & Hart LLP

(57) ABSTRACT

Methods, systems, and devices for wireless communications are described. A user equipment (UE) may receiving control signaling indicating an uplink configured grant including a set of physical uplink shared channel (PUSCH) transmission occasions. The UE may transmit a PUSCH message within a first PUSCH transmission occasion of the set of PUSCH transmission occasions. The UE may transmit an uplink control information (UCI) message indicating a second PUSCH transmission occasion of the set of PUSCH transmission occasions that will be unused by the UE, where the second PUSCH transmission occasion is based on a quantity of uplink traffic within a message buffer at the UE, the second PUSCH transmission occasion conflicting with a set of reserved resources, or both. The UE may then communicate with a network entity based on transmitting the UCI message, where the communicating includes refraining from transmitting messages within the second PUSCH transmission occasion.

27 Claims, 16 Drawing Sheets

(58) Field of Classification Search
CPC ..... H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

OTHER PUBLICATIONS

Huawei, et al., "Discussion on XR—Specific Capacity Enhancements Techniques", 3GPP TSG RAN WG1 Meeting #110bis-e, 3GPP Draft, R1-2208421, 3rd Generation Partnership Project, Mobile Competence Centre, 650, Route Des Lucioles, F-06921 Sophia-Antipolis Cedex, France, vol. RAN WG1, No. e -Meeting, Oct. 10, 2022-Oct. 19, 2022, Sep. 30, 2022, XP052276346, 14 pages, section 2.4.

International Search Report and Written Opinion—PCT/US2024/011834—ISA/EPO—Apr. 16, 2024.

Moderator (Ericsson) : "Moderator Summary#4 (Final)—Study on XR Specific Capacity Improvements", 3GPP TSG-RAN WG1 Meeting #111, 3GPP Draft, R1-2212609, Type Discussion, FS_NR XR ENH, 3rd Generation Partnership Project, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 21, 2022, XP052223160, 82 pages, p. 28, line 14-p. 29, line 2.

Moderator (Ericsson): "Moderator Summary#1—Study on XR Specific Capacity Improvements", 3GPP TSG-RAN WG1 Meeting #110bis-e, R1-2210410, 3rd Generation Partnership Project, Mobile Competence Centre, 650, Route Des Lucioles, F-06921 Sophia-Antipolis Cedex, France vol. RAN WG1, No. E-meeting, Oct. 10, 2022-Oct. 19, 2022, Oct. 12, 2022, 142 Pages, XP052259877, paragraph [0094]-paragraph [0096], p. 21, line 28-p. 22, line 18, p. 21, figure 5 p. 22, figure 2.

Nokia, et al., "Handling of De-Prioritized MAC PDUs", 3GPP Draft, 3GPP TSG-RAN WG2 Meeting #107, R2-1909499, Handling of De-prioritized MAC PDUs, 3rd Generation Partnership Project (3GPP), Mobile Competence Centre, 650, Route Des Lucioles, F-06921, Sophia-Antipolis Cedex, France, vol. RAN WG2, No. Prague, Czech Republic, Aug. 26, 2019-Aug. 30, 2019, Aug. 15, 2019, XP051767296, 3 pages, Discussion; p. 2, paragraph 2, p. 2, lines 12-18.

* cited by examiner

TECHNIQUES FOR INDICATING UNUSED CONFIGURED GRANT PUSCH OCCASIONS

FIELD OF DISCLOSURE

The following relates to wireless communications, including techniques for indicating unused configured grant physical uplink shared channel (CG-PUSCH) occasions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless networks, wireless devices (e.g., UEs) may receive a configured grant physical uplink shared channel (CG-PUSCH) configuration that includes a set of multiple PUSCH transmission occasions usable by the UE for transmitting PUSCH messages. In other words, a UE may be pre-configured with a set of PUSCH occasions that may be used by the UE to transmit uplink data. However, in cases where the UE does not utilize all the configured PUSCH occasions, the resources go to waste, leading to inefficient resource utilization within the network.

SUMMARY

The described techniques relate to improved methods, systems, devices, and apparatuses that support techniques for indicating unused configured grant physical uplink shared channel (CG-PUSCH) occasions. Generally, aspects of the present disclosure are directed to configurations and signaling that enables user equipments (UEs) to dynamically indicate PUSCH transmission occasions that will be unused. In other words, aspects of the present disclosure are directed to signaling that enables a UE to report which PUSCH occasions it will not use so that the network can reallocate the unused resources for other types of signaling, and/or to other devices. For example, a UE may receive a CG-PUSCH configuration that includes a set of multiple PUSCH occasions usable by the UE for transmitting PUSCH messages. In this example, the UE may identify which PUSCH occasions it will not use (e.g., unused PUSCH occasions), either because of small amount of data within a message buffer at the UE or because the respective PUSCH occasions conflict with other reserved resources. Subsequently, the UE may transmit an uplink control information (UCI) message that indicates the unused PUSCH occasions, and may refrain from communication PUSCH messages within the indicates unused occasions.

A method is described. The method may include receiving control signaling indicating an uplink configured grant (e.g., CG-PUSCH configuration) including a set of multiple uplink shared channel transmission occasions (e.g., PUSCH transmission occasions) within a period of the uplink configured grant usable by the UE, transmitting, in response to receiving the control signaling, an uplink shared channel message (e.g., PUSCH message) within a first uplink shared channel transmission occasion of the set of multiple uplink shared channel transmission occasions, transmitting a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both, and communicating with a network entity based on transmitting the UCI message, where the communicating includes refraining from transmitting messages within the second uplink shared channel transmission occasion.

An apparatus is described. The apparatus may include a processor, memory coupled with the processor, and instructions stored in the memory. The instructions may be executable by the processor to cause the apparatus to receive control signaling indicating an uplink configured grant including a set of multiple uplink shared channel transmission occasions within a period of the uplink configured grant usable by the UE, transmit, in response to receiving the control signaling, an uplink shared channel message within a first uplink shared channel transmission occasion of the set of multiple uplink shared channel transmission occasions, transmit a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both, and communicate with a network entity based on transmitting the UCI message, where the communicating includes refraining from transmitting messages within the second uplink shared channel transmission occasion.

Another apparatus is described. The apparatus may include means for receiving control signaling indicating an uplink configured grant including a set of multiple uplink shared channel transmission occasions within a period of the uplink configured grant usable by the UE, means for transmitting, in response to receiving the control signaling, an uplink shared channel message within a first uplink shared channel transmission occasion of the set of multiple uplink shared channel transmission occasions, means for transmitting a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both, and means for communicating with a network entity based on transmitting the UCI message, where the communicating includes refraining from transmitting messages within the second uplink shared channel transmission occasion.

A non-transitory computer-readable medium storing code is described. The code may include instructions executable by a processor to receive control signaling indicating an uplink configured grant including a set of multiple uplink shared channel transmission occasions within a period of the uplink configured grant usable by the UE, transmit, in response to receiving the control signaling, an uplink shared channel message within a first uplink shared channel transmission occasion of the set of multiple uplink shared channel transmission occasions, transmit a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both, and communicate with a network entity based on transmitting the UCI message, where the communicating includes refraining from transmitting messages within the second uplink shared channel transmission occasion.

In some examples of the method, apparatuses, and non-transitory computer-readable medium described herein, communicating with the network entity may include operations, features, means, or instructions for transmitting an uplink control channel message that at least partially overlaps with the second uplink shared channel transmission occasion in a time domain, a frequency domain, or both.

Some examples of the method, apparatuses, and non-transitory computer-readable medium described herein may further include operations, features, means, or instructions for receiving, via the control signaling, additional control signaling, or both, a resource configuration including the set of reserved resources allocated for communications between the network entity and the UE and identifying that the second uplink shared channel transmission occasion will be unused based on the second uplink shared channel transmission occasion overlapping with the set of reserved resources in a time domain, a frequency domain, or both, where transmitting the UCI message may be based on the identifying.

In some examples of the method, apparatuses, and non-transitory computer-readable medium described herein, the set of reserved resources include a set of downlink symbols of a time division duplexing (TDD) configuration, a set of synchronization signal block (SSB) resources, a control resource set (CORESET), a search space, a set of cross-link interference measurement resources, or any combination thereof.

In some examples of the method, apparatuses, and non-transitory computer-readable medium described herein, the UCI message may be transmitted via an uplink control channel, via the set of multiple uplink shared channel transmission occasions, or both.

In some examples of the method, apparatuses, and non-transitory computer-readable medium described herein, transmitting the UCI message may include operations, features, means, or instructions for transmitting the UCI message including a set of bit field values indicating a set of uplink shared channel transmission occasions including the second uplink shared channel transmission occasion will be unused, where the set of bit field values include a codepoint, a bitmap, or both.

Some examples of the method, apparatuses, and non-transitory computer-readable medium described herein may further include operations, features, means, or instructions for receiving, via the control signaling, additional control signaling, or both, a data object indicating a set of mappings between sets of uplink shared channel transmission occasions and corresponding sets of bit field values, where the set of bit field values corresponds to a mapping of the set of mappings that may be associated with the set of uplink shared channel transmission occasions.

In some examples of the method, apparatuses, and non-transitory computer-readable medium described herein, transmitting the UCI message may include operations, features, means, or instructions for transmitting the UCI message including a single bit field value indicating that a subsequent uplink shared channel transmission occasion following the UCI message will be unused, where the subsequent uplink shared channel transmission occasion includes the second uplink shared channel transmission occasion.

In some examples of the method, apparatuses, and non-transitory computer-readable medium described herein, transmitting the UCI message may include operations, features, means, or instructions for transmitting the UCI message including a single bit field value indicating that all uplink shared channel transmission occasions of the set of multiple uplink shared channel transmission occasions following the UCI message will be unused.

Some examples of the method, apparatuses, and non-transitory computer-readable medium described herein may further include operations, features, means, or instructions for receiving, via the control signaling, an indication of a set of resources allocated for UCI messages indicating unused uplink shared channel transmission occasions, where the UCI messages may be transmitted within the set of resources.

In some examples of the method, apparatuses, and non-transitory computer-readable medium described herein, transmitting the UCI message may include operations, features, means, or instructions for transmitting the UCI message prior to an earliest uplink shared channel transmission occasion of the set of multiple uplink shared channel transmission occasions, or within the earliest uplink shared channel transmission occasion.

In some examples of the method, apparatuses, and non-transitory computer-readable medium described herein, transmitting the UCI message may include operations, features, means, or instructions for transmitting a set of multiple UCI messages within the set of multiple uplink shared channel transmission occasions, where each UCI message of the set of multiple UCI messages indicates one or more unused uplink shared channel transmission occasions.

Some examples of the method, apparatuses, and non-transitory computer-readable medium described herein may further include operations, features, means, or instructions for receiving, via the control signaling, an indication of one or more parameters associated with the UCI message, where the UCI message may be transmitted in accordance with the one or more parameters, and where the one or more parameters include a priority associated the UCI message, a control message format of associated with the UCI message, a condition for multiplexing the UCI message with other types of messages, an offset for transmitting the UCI message within an uplink shared channel transmission occasion of the set of multiple uplink shared channel transmission occasions, or any combination thereof.

Some examples of the method, apparatuses, and non-transitory computer-readable medium described herein may further include operations, features, means, or instructions for transmitting the UCI message to both the first transmission-reception point (TRP) and the second TRP.

Some examples of the method, apparatuses, and non-transitory computer-readable medium described herein may further include operations, features, means, or instructions for transmitting the UCI message only to the first TRP based on the second uplink shared channel transmission occasion being included within the first subset of uplink shared channel transmission occasions associated with the first TRP.

Some examples of the method, apparatuses, and non-transitory computer-readable medium described herein may further include operations, features, means, or instructions for receiving, via the control signaling, additional control signaling, or both, an indication of a set of carriers that support unlicensed communications, where the UCI message may be transmitted via an additional carrier that may be not included within the set of carriers.

In some examples of the method, apparatuses, and non-transitory computer-readable medium described herein, communicating with the network entity may include operations, features, means, or instructions for refraining from transmitting messages within a third uplink shared channel message that was not indicated as being unused by the UCI message.

In some examples of the method, apparatuses, and non-transitory computer-readable medium described herein, transmitting the UCI message may include operations, features, means, or instructions for transmitting, at a first time, a first UCI message including first information associated with unused uplink shared channel transmission occasions of the set of multiple uplink shared channel transmission occasions and transmitting, at a second time subsequent to the first time, a second UCI message including second information associated with unused uplink shared channel transmission occasions of the set of multiple uplink shared channel transmission occasions, where the first information, the second information, or both, indicates the second uplink shared channel transmission occasion, and where the second information overwrites the first information, or where the second information may be the same as the first information.

A method is described. The method may include transmitting, to a UE, control signaling indicating an uplink configured grant including a set of multiple uplink shared channel transmission occasions within a period of the uplink configured grant usable by the UE, receiving, in response to receiving the control signaling, an uplink shared channel message within a first uplink shared channel transmission occasion of the set of multiple uplink shared channel transmission occasions, receiving a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both, and communicating with the UE based on transmitting the UCI message, where the communicating includes refraining from monitoring for messages within the second uplink shared channel transmission occasion.

An apparatus is described. The apparatus may include a processor, memory coupled with the processor, and instructions stored in the memory. The instructions may be executable by the processor to cause the apparatus to transmit, to a UE, control signaling indicating an uplink configured grant including a set of multiple uplink shared channel transmission occasions within a period of the uplink configured grant usable by the UE, receive, in response to receiving the control signaling, an uplink shared channel message within a first uplink shared channel transmission occasion of the set of multiple uplink shared channel transmission occasions, receive a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both, and communicate with the UE based on transmitting the UCI message, where the communicating includes refraining from monitoring for messages within the second uplink shared channel transmission occasion.

Another apparatus is described. The apparatus may include means for transmitting, to a UE, control signaling indicating an uplink configured grant including a set of multiple uplink shared channel transmission occasions within a period of the uplink configured grant usable by the UE, means for receiving, in response to receiving the control signaling, an uplink shared channel message within a first uplink shared channel transmission occasion of the set of multiple uplink shared channel transmission occasions, means for receiving a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both, and means for communicating with the UE based on transmitting the UCI message, where the communicating includes refraining from monitoring for messages within the second uplink shared channel transmission occasion.

A non-transitory computer-readable medium storing code is described. The code may include instructions executable by a processor to transmit, to a UE, control signaling indicating an uplink configured grant including a set of multiple uplink shared channel transmission occasions within a period of the uplink configured grant usable by the UE, receive, in response to receiving the control signaling, an uplink shared channel message within a first uplink shared channel transmission occasion of the set of multiple uplink shared channel transmission occasions, receive a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both, and communicate with the UE based on transmitting the UCI message, where the communicating includes refraining from monitoring for messages within the second uplink shared channel transmission occasion.

In some examples of the method, apparatuses, and non-transitory computer-readable medium described herein, communicating with the UE may include operations, features, means, or instructions for receiving an uplink control channel message that at least partially overlaps with the second uplink shared channel transmission occasion in a time domain, a frequency domain, or both.

Some examples of the method, apparatuses, and non-transitory computer-readable medium described herein may further include operations, features, means, or instructions for transmitting, via the control signaling, additional control signaling, or both, a resource configuration including the set of reserved resources allocated for communications between the network entity and the UE, where receiving the UCI message may be based on the second uplink shared channel transmission occasion overlapping with the set of reserved resources in a time domain, a frequency domain, or both.

In some examples of the method, apparatuses, and non-transitory computer-readable medium described herein, the set of reserved resources include a set of downlink symbols of a TDD configuration, a set of SSB resources, a CORE-SET, a search space, a set of cross-link interference measurement resources, or any combination thereof.

In some examples of the method, apparatuses, and non-transitory computer-readable medium described herein, the UCI message may be transmitted via an uplink control channel, via the set of multiple uplink shared channel transmission occasions, or both.

In some examples of the method, apparatuses, and non-transitory computer-readable medium described herein, receiving the UCI message may include operations, features, means, or instructions for receiving the UCI message including a set of bit field values indicating a set of uplink shared channel transmission occasions including the second uplink shared channel transmission occasion will be unused, where the set of bit field values include a codepoint, a bitmap, or both.

Some examples of the method, apparatuses, and non-transitory computer-readable medium described herein may further include operations, features, means, or instructions for transmitting, via the control signaling, additional control signaling, or both, a data object indicating a set of mappings between sets of uplink shared channel transmission occasions and corresponding sets of bit field values, where the set of bit field values corresponds to a mapping of the set of mappings that may be associated with the set of uplink shared channel transmission occasions.

In some examples of the method, apparatuses, and non-transitory computer-readable medium described herein, receiving the UCI message may include operations, features, means, or instructions for receiving the UCI message including a single bit field value indicating that a subsequent uplink shared channel transmission occasion following the UCI message will be unused, where the subsequent uplink shared channel transmission occasion includes the second uplink shared channel transmission occasion.

In some examples of the method, apparatuses, and non-transitory computer-readable medium described herein, receiving the UCI message may include operations, features, means, or instructions for receiving the UCI message including a single bit field value indicating that all uplink shared channel transmission occasions of the set of multiple uplink shared channel transmission occasions following the UCI message will be unused.

Some examples of the method, apparatuses, and non-transitory computer-readable medium described herein may further include operations, features, means, or instructions for transmitting, via the control signaling, an indication of a set of resources allocated for UCI messages indicating unused uplink shared channel transmission occasions, where the UCI messages may be received within the set of resources.

In some examples of the method, apparatuses, and non-transitory computer-readable medium described herein, receiving the UCI message may include operations, features, means, or instructions for receiving the UCI message prior to an earliest uplink shared channel transmission occasion of the set of multiple uplink shared channel transmission occasions, or within the earliest uplink shared channel transmission occasion.

In some examples of the method, apparatuses, and non-transitory computer-readable medium described herein, receiving the UCI message may include operations, features, means, or instructions for receiving a set of multiple UCI messages within the set of multiple uplink shared channel transmission occasions, where each UCI message of the set of multiple UCI messages indicates one or more unused uplink shared channel transmission occasions.

Some examples of the method, apparatuses, and non-transitory computer-readable medium described herein may further include operations, features, means, or instructions for transmitting, via the control signaling, an indication of one or more parameters associated with the UCI message, where the UCI message may be received in accordance with the one or more parameters, and where the one or more parameters include a priority associated the UCI message, a control message format of associated with the UCI message, a condition for multiplexing the UCI message with other types of messages, an offset for transmitting the UCI message within an uplink shared channel transmission occasion of the set of multiple uplink shared channel transmission occasions, or any combination thereof.

Some examples of the method, apparatuses, and non-transitory computer-readable medium described herein may further include operations, features, means, or instructions for transmitting, via the control signaling, additional control signaling, or both, an indication of a set of carriers that support unlicensed communications, where the UCI message may be received via an additional carrier that may be not included within the set of carriers.

Some examples of the method, apparatuses, and non-transitory computer-readable medium described herein may further include operations, features, means, or instructions for transmitting, via the control signaling, additional control signaling, or both, an indication of a carrier that supports unlicensed communications, where the UCI message may be received via the carrier, and where the UCI message may be multiplexed with one or more messages associated with unlicensed communications between the UE and the network entity.

DETAILED DESCRIPTION

Figure 1:
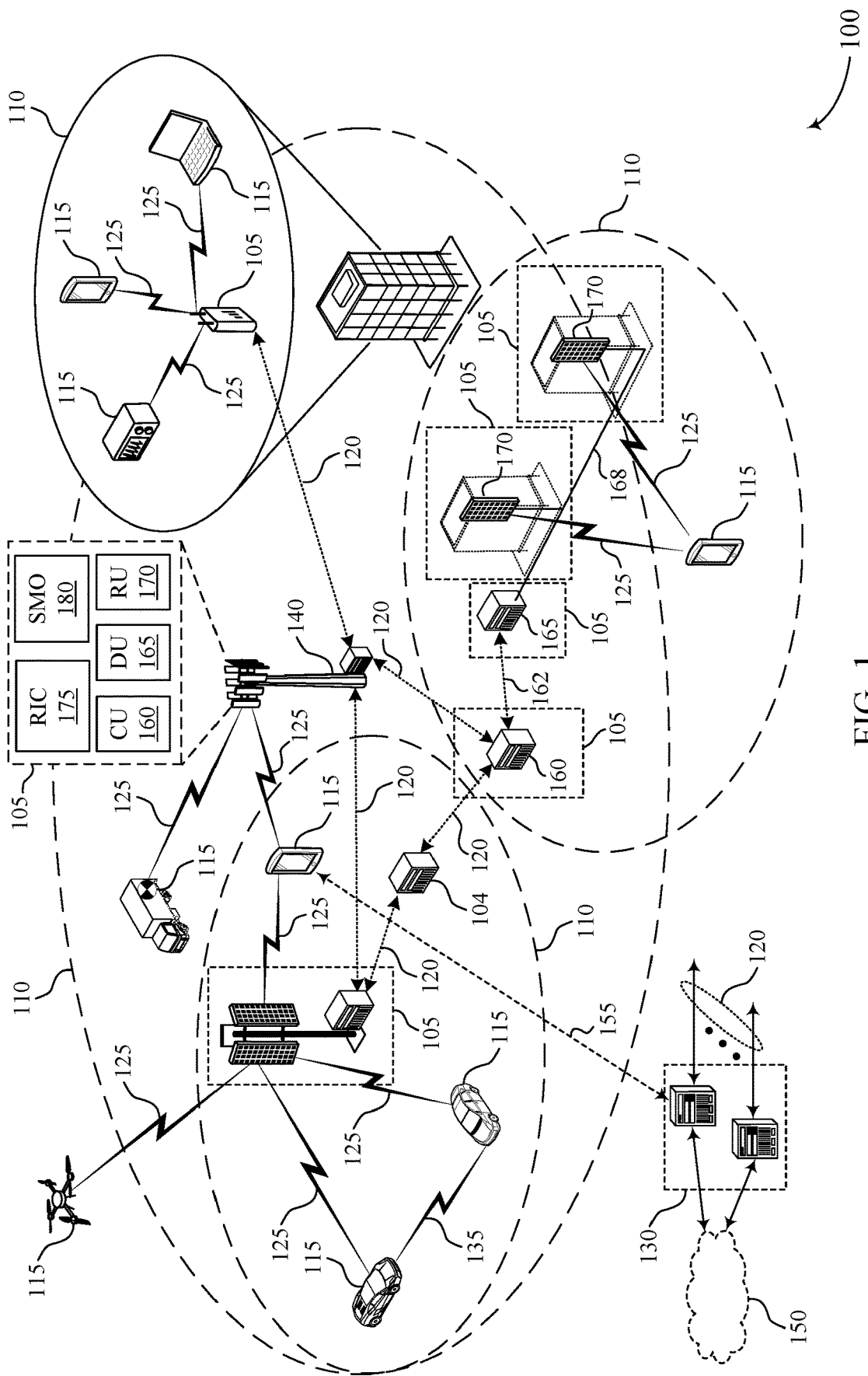
FIG. 1 illustrates an example of a wireless communications system that supports techniques for indicating unused configured grant physical uplink shared channel (CG-PUSCH) occasions in accordance with various aspects of the present disclosure.

In some wireless networks, wireless devices (e.g., user equipments (UEs)) may receive a configured grant physical uplink shared channel (CG-PUSCH) configuration that includes a set of multiple PUSCH transmission occasions usable by the UE for transmitting PUSCH messages. In other words, a UE may be pre-configured with a set of PUSCH occasions that may be used by the UE to transmit uplink data. However, in some scenarios, a message buffer at the UE may include only a small quantity of uplink data to be transmitted. In such cases, the UE may not use all of the configured PUSCH occasions, and the resources may go wasted. Additionally, or alternatively, configured PUSCH occasions may conflict with other types of configured resources, such as resources for synchronization signal blocks (SSBs), resources of a control resource set (CORESET), or both. In such cases, the UE may refrain from transmitting messages within the PUSCH occasions that conflict with the other resources, again leading to a waste of resources.

Accordingly, aspects of the present disclosure are directed to configurations and signaling that enable UEs to dynamically indicate which PUSCH occasions will be unused. In other words, aspects of the present disclosure support signaling that enables a UE to report which PUSCH occasions it will not use so that the network can reallocate the unused resources for other types of signaling, and/or to other devices. For example, a UE may receive a CG-PUSCH configuration that includes a set of multiple PUSCH occasions usable by the UE for transmitting PUSCH messages. In this example, the UE may identify which PUSCH occasions it will not use (e.g., unused PUSCH occasions), either because of small amount of data within a message buffer at the UE or because the respective PUSCH occasions conflict with other reserved resources. Subsequently, the UE may transmit a UCI message that indicates the unused PUSCH occasions, and may refrain from communication PUSCH messages within the indicates unused occasions.

The UE may be configured to transmit the UCI message via a physical uplink control channel (PUCCH), via the PUSCH occasions (e.g., CG-UCI), or both. For example, in some cases, the UE may be configured to transmit a UCI within each PUSCH occasion, where the UCIs indicate whether the subsequent PUSCH occasion will be unused or not. By way of another example, the UE may transmit a single UCI that includes a bitmap or codepoint that indicates which PUSCH occasions will be unused. Moreover, in some cases, the UE may be able to transmit other types of messages (e.g., PUCCH messages) that overlap with unused PUSCH occasions.

Aspects of the disclosure are initially described in the context of wireless communications systems. Additional aspects of the disclosure are described in the context of an example network architecture, an example resource configuration, and an example process flow. Aspects of the disclosure are further illustrated by and described with reference to apparatus diagrams, system diagrams, and flowcharts that relate to techniques for indicating unused CG-PUSCH occasions.

FIG. 1 illustrates an example of a wireless communications system 100 that supports techniques for indicating unused CG-PUSCH occasions in accordance with various aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for indicating unused CG-PUSCH occasions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a respective bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a respective radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a respective carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multi-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along respective orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a respective orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a respective receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The UEs 115 and the network entities 105 of the wireless communications system 100 may support configurations and signaling that enable the UEs 115 to dynamically indicate which PUSCH occasions will be unused. In other words, the wireless communications system 100 may support signaling that enables a UE 115 to report which PUSCH occasions it will not use so that the network can reallocate the unused resources for other types of signaling, and/or to other devices.

For example, a UE 115 of the wireless communications system 100 may receive a CG-PUSCH configuration from the network, where the CG-PUSCH configuration includes a set of multiple PUSCH occasions usable by the UE 115 for transmitting PUSCH messages. In this example, the UE 115 may identify which PUSCH occasions it will not use (e.g., unused PUSCH occasions), either because of small amount of data within a message buffer at the UE 115 or because the respective PUSCH occasions conflict with other reserved resources. Subsequently, the UE 115 may transmit a UCI message that indicates the unused PUSCH occasions, and may refrain from communication PUSCH messages within the indicates unused occasions.

The UE 115 may be configured to transmit the UCI message via a physical uplink control channel (PUCCH), via the PUSCH occasions, or both. For example, in some cases, the UE 115 may be configured to transmit a UCI within each PUSCH occasion, where the UCIs indicate whether the subsequent PUSCH occasion will be unused or not. By way of another example, the UE 115 may transmit a single UCI that includes a bitmap or codepoint that indicates which PUSCH occasions will be unused. Moreover, in some cases, the UE 115 may be able to transmit other types of messages (e.g., PUCCH messages) that overlap with unused PUSCH occasions.

Techniques described herein may enable UEs 115 to dynamically indicate which PUSCH occasions will go unused by the UE 115, either because of a lack of data to be transmitted within a message buffer at the UE 115, or because the unused PUSCH occasions conflict with other configured resources. As such, by enabling UEs 115 to dynamically indicate which PUSCH occasions will be unused, techniques described herein may enable the network to reallocate unused PUSCH occasions to other devices and/or for other types of communications. As such, techniques described herein may lead to more efficient resource utilization within the wireless communications system 100.

Figure 2:
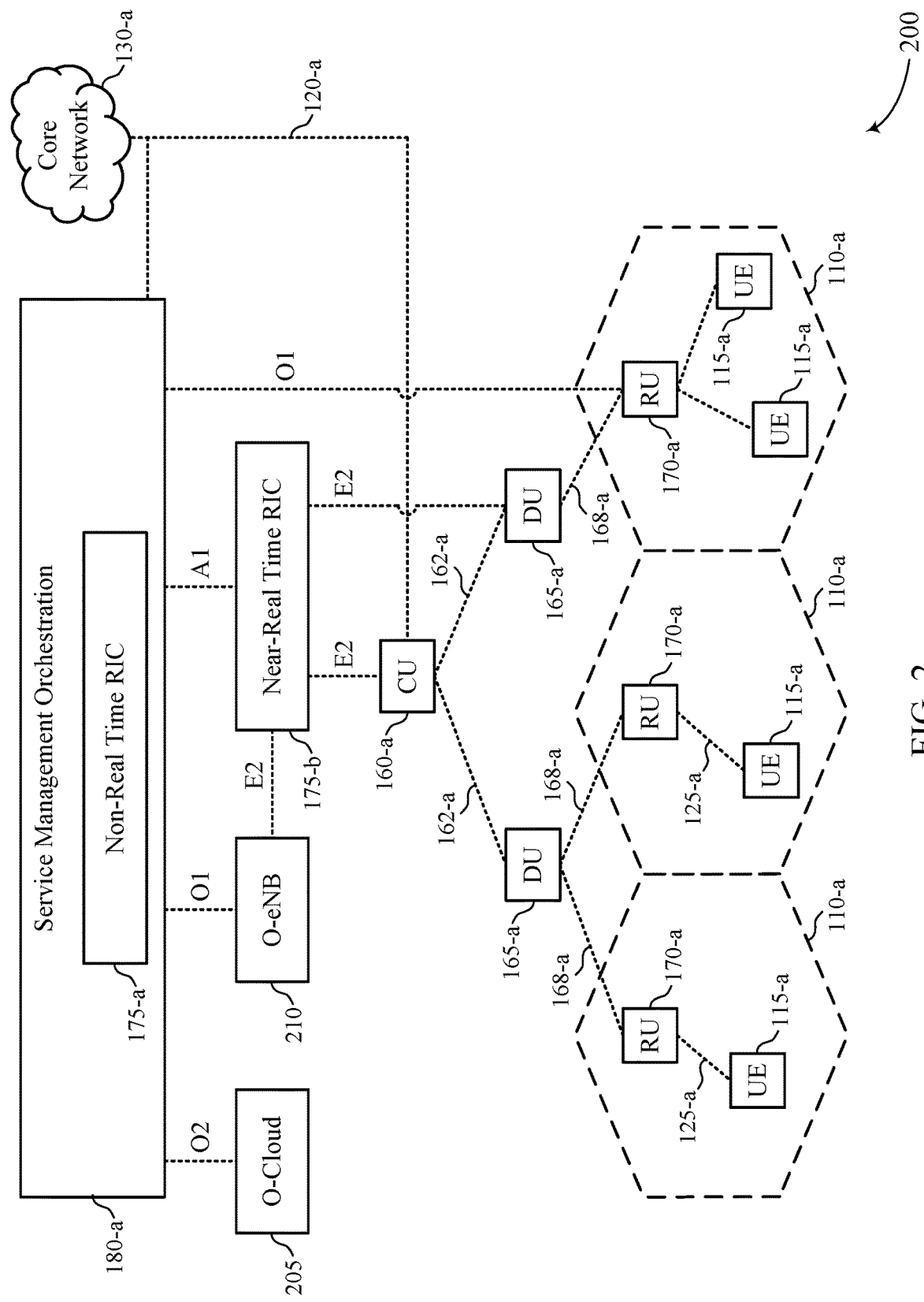
FIG. 2 illustrates an example of a network architecture that supports techniques for indicating unused CG-PUSCH occasions in accordance with various aspects of the present disclosure.

FIG. 2 illustrates an example of a network architecture 200 (e.g., a disaggregated base station architecture, a disaggregated RAN architecture) that supports techniques for indicating unused CG-PUSCH occasions in accordance with various aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
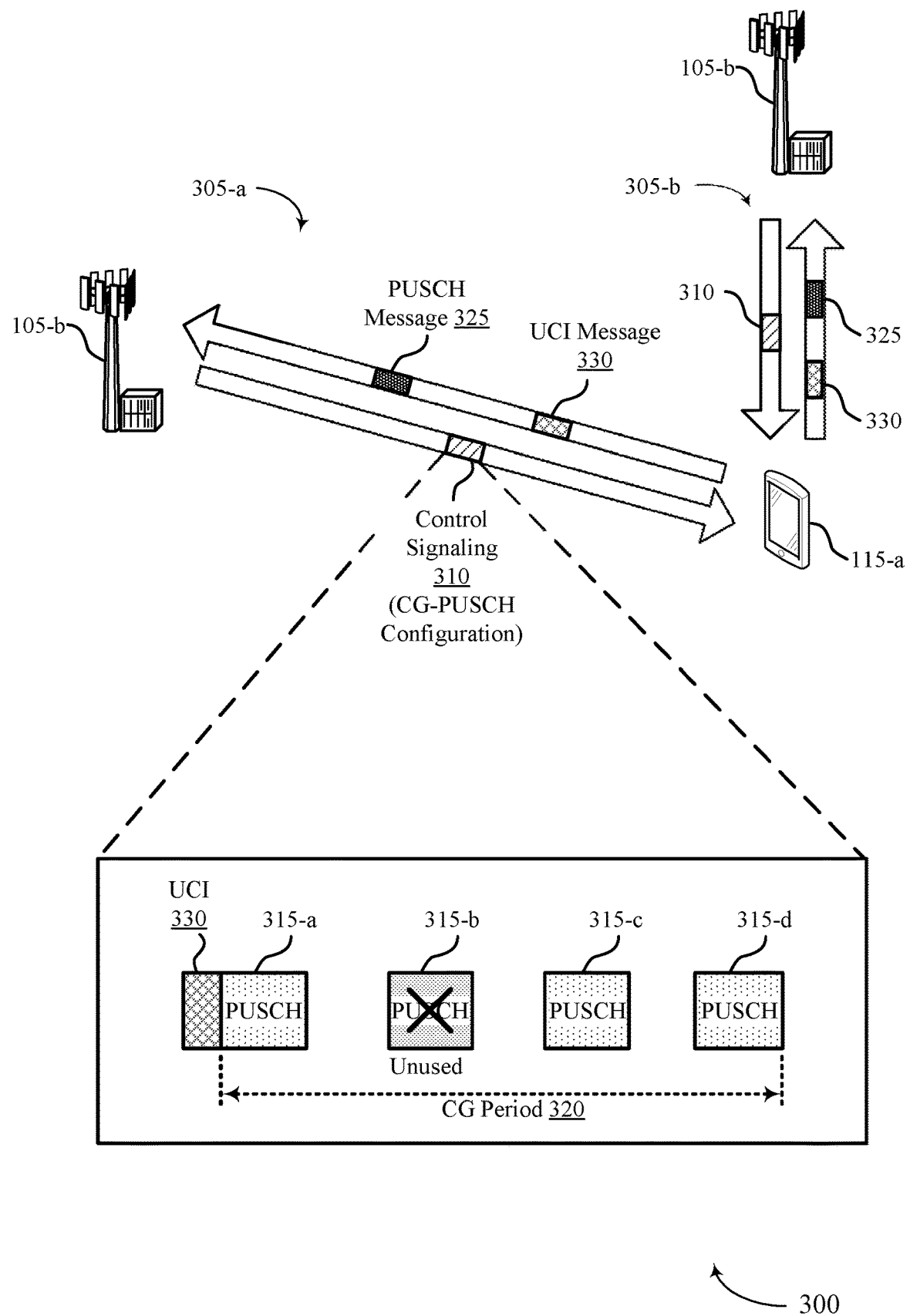
FIG. 3 illustrates an example of a wireless communications system that supports techniques for indicating unused CG-PUSCH occasions in accordance with various aspects of the present disclosure.

FIG. 3 illustrates an example of a wireless communications system 300 that supports techniques for indicating unused CG-PUSCH occasions in accordance with various aspects of the present disclosure. Aspects of the wireless communications system 300 may implement, or be implemented by, aspects of wireless communications system 100, the network architecture 200, or both. For example, the wireless communications system 300 may support techniques for dynamically indicating unused PUSCH occasions, as described previously herein.

The wireless communications system 300 may include a UE 115-*a*, a first network entity 105-*a*, and a second network entity 105-*b*, which may be examples of UEs 115, network entities 105, and other wireless devices as described with reference to FIG. 1. In some aspects, the UE 115-*a* may communicate with the network entities 105 via communication links 305-*a* and 305-*b*. In some cases, the communication links 305 may include examples of access links (e.g., Uu links). The communication links 305 may include bi-directional links that can include both uplink and downlink communication. For example, the UE 115-*a* may transmit uplink transmissions, such as uplink control signals or uplink data signals, to the first network entity 105-*a* using the communication link 305-*a*, and the first network entity 105-*a* may transmit downlink transmissions, such as downlink control signals or downlink data signals, to the UE 115-*a* using the communication link 305-*a*.

In some aspects, the network entities 105-*a*, 105-*b* illustrated in FIG. 3 may include separate network nodes or devices. In additional or alternative implementations, the network entities 105-*a*, 105-*b* may include examples of separate transmission-reception points (TRPs) associated with one or more network nodes or devices. For example, the first network entity 105-*a* and the second network entity 105-*b* may include examples of a first TRP (e.g., TRP1) and a second TRP (e.g., TRP2), respectively.

As noted previously herein, in some wireless networks, wireless devices (e.g., UEs 115) may receive signaling indicating a CG-PUSCH configuration that includes a set of multiple PUSCH transmission occasions usable by the respective UEs 115 for transmitting PUSCH messages. In other words, a UE 115 may receive a CG-PUSCH configuration including preconfigured uplink transmission opportunities that are usable by the UE 115. In such cases, the UE 115 may transmit a PUSCH within the allocated resources (e.g., within the PUSCH occasions) if the UE 115 has uplink data in a message buffer. Such CG-PUSCH configurations may be usable in cases where the uplink data at the UE 115 has a variable instantaneous data generation rate.

However, in some scenarios, a message buffer at the UE 115 may not include uplink data to be transmitted (or may include a small amount of data to be transmitted). In such cases, the UE 115 may not use all the configured PUSCH occasions, and the resources may go wasted. In other words, the UE 115 may skip a CG-PUSCH occasion if the UE 115 does not have any uplink data to transmit within a message buffer. In some aspects, a parameter skipUplinkTxDynamic (which may be configured via RRC) may be used to indicate whether a UE 115 supports skipping an uplink transmission for an uplink grant indicated on PDCCH if no data is available for transmission. Comparatively, the UE 115 may optionally be configured to skip PUSCH occasions that are dynamically configured (e.g., dynamic grant (DG) PUSCH occasions).

Additionally, or alternatively, CG-PUSCH occasions may conflict with other types of configured resources, such as resources for SSBs, resources of a CORESET, or both. In such cases, the UE may refrain from transmitting messages within the PUSCH occasions that conflict with the other resources, again leading to a waste of resources.

Accordingly, the UE 115-*a* and the network entities 105 of the wireless communications system 300 may support configurations and signaling that enable the UE 115-*a* to dynamically indicate which PUSCH occasions of a CG-PUSCH configuration will be unused. In other words, aspects of the present disclosure support signaling that enables the UE 115-*a* to report which PUSCH occasions it will not use so that the network can reallocate the unused resources for other types of signaling, and/or to other devices.

For example, referring to the wireless communications system 300 illustrated in FIG. 3, the UE 115-*a* may receive control signaling 310 from the first network entity 105-*a* (e.g., TRP1), the second network entity 105-*b* (e.g., TRP2), or both. In some aspects, the control signaling 310 may indicate an uplink configured grant including a set of uplink shared channel transmission occasions usable by the UE 115-*a* within a CG period 320. In other words, the UE 115-*a* may receive control signaling 310 indicating a CG-PUSCH configuration that includes multiple PUSCH transmission occasions 315 (e.g., PUSCH transmission occasions 315-*a*, 315-*b*, 315-*c*, 315-*d*) usable by the UE 115-*a* for transmitting PUSCH messages 325.

In some cases, the uplink configured grant may indicate a first subset of PUSCH transmission occasions 315 usable for transmitting PUSCH messages 325 to the first network entity 105-*a* (e.g., first TRP), and a second subset of PUSCH transmission occasions 315 usable for transmitting PUSCH messages 325 to the second network entity 105-*b* (e.g., second TRP). For example, in some cases, the first PUSCH transmission occasion 315-*a* and the second PUSCH transmission occasion 315-*b* may be associated with the first network entity 105-*a*, and the third PUSCH transmission occasion 315-*c* and the fourth PUSCH transmission occasion 315-*d* may be associated with the second network entity 505-*b*. In additional or alternative implementations, the UE 115-*a* may receive separate CG-PUSCH configurations that each include respective sets of PUSCH transmission occasions 315 for communicating with the respective TRPs (e.g., first CG-PUSCH configuration for the first network entity 105-*a*, second CG-PUSCH configuration for the second network entity 105-*b*).

In some implementations, the control signaling 310 (and/or other control signaling 310) may additionally configure other sets of resources at the UE 115-*a* that may overlap or otherwise conflict with the PUSCH transmission occasions 315. For example, the control signaling 310 may indicate a resource configuration (e.g., semi-static configuration, dynamic configuration) that includes a set of resources reserved for communications between the UE 115-*a* and the network entities 105. In this regard, the control signaling 310 (and/or additional control signaling 310) may include RRC signaling, downlink control information (DCI) signaling, MAC-CE signaling, and the like.

For instance, in the context of a semi-static configuration, the set of resources may include a set of downlink symbols of a TDD configuration, SSB resources, a CORESET (e.g., CORESET for a Type0 PDCCH common search space (CSS) set), a search space, a set of cross-link interference (CLI) measurement resources, and the like. Comparatively, in the context of a dynamic configuration, the set of resources may include resources for a downlink reception scheduled by a dynamic grant, a downlink or flexible symbol indicated by a slot format indicator (SFI) DCI, resources for other higher-priority uplink transmissions, and the like.

In some implementations, the control signaling 310 may indicate other parameters or characteristics associated with the CG-PUSCH configuration that enable the UE 115-*a* to indicate unused PUSCH transmission occasions 315. For example, in some cases, the control signaling 310 may indicate sets of resources that are to be used by the UE 115-*a* to transmit UCI messages 330 indicating unused PUSCH transmission occasions 315. In other words, the control signaling 310 may indicate whether the UE 115-*a* is to transmit a single UCI message 330 indicating unused PUSCH transmission occasions 315, whether the UE 115-*a* is to transmit a UCI message 330 indicating unused PUSCH transmission occasions 315 within each PUSCH transmission occasion 315 (or each used PUSCH transmission occasion 315), and the like.

Moreover, in some aspects, the control signaling 310 may mappings, rules, or other conditions that indicate how unused PUSCH transmission occasions 315 are to be indicated via UCI messages 330. For example, in some cases, the control signaling 310 may indicate whether UCI messages 330 are to indicate unused PUSCH transmission occasions 315 using one bit field value, using multiple bit field values (e.g., codepoints, bitmaps), or both. Various implementations regarding how UCI messages 330 use bit field values to indicate unused resources will be described in further detail herein.

For example, the control signaling 310 may indicate one or more rules, conditions, and/or mappings that indicate how bit field values of UCI messages 330 are to be used to indicate unused PUSCH transmission occasions 315. For example, UCI messages 330 may utilize a single bit value (e.g., 0 or 1) as a termination indication to indicate whether the next PUSCH transmission occasion 315 (e.g., PUSCH transmission occasion 315 immediately following the UCI messages 330, or the second PUSCH transmission occasion 315 immediately following the UCI messages 330) is unused, or whether the single bit field value indicates that all remaining PUSCH transmission occasions 315 following the UCI message 330 are unused. In this example, the control signaling 310 may indicate which of these rules are to be used for indicating unused occasions.

In other cases, UCI messages 330 may include multiple bit field values (e.g., bitmaps or codepoints) that indicate unused PUSCH transmission occasions 315 (where the control signaling 310 indicates which format to use). In the context of a bitmap, the ith bit field value of the bitmap may be used to indicate the ith PUSCH transmission occasion 315 of the CG period 320, where a bit field value of "1" indicates that the PUSCH transmission occasion 315 is unused, and a bit field value of "0" indicates that the PUSCH transmission occasion 315 will be used (or vice versa). In such cases, the network may ignore bit field values that indicate a respective PUSCH transmission occasion 315 will be used, or treat these bit field values as unknown states (e.g., whether PUSCH is transmitted on the respective PUSCH transmission occasion 315 is unknown) of the indicated respective PUSCH transmission occasions 315. For example, referring to FIG. 3, the UCI message 330 may include a bitmap with values "0 1 0 0" indicating that the second PUSCH transmission occasion 315-b will be unused, and that the first, third, and fourth PUSCH transmission occasions 315 will be used, or whether the first, third, and fourth PUSCH transmission occasions 315 are used is unknown (e.g., not unused).

In yet other cases, UCI messages 330 may include a codepoint to indicate unused PUSCH transmission occasions 315. For example, a codepoint may indicate the index for the first unused PUSCH transmission occasion 315, and/or an entry of a data object (e.g., table) that contains mappings between codepoint indices and corresponding patterns of unused PUSCH transmission occasions 315 (similar to a time domain resource allocation (TDRA) table). For example, the control signaling 310 may indicate various preconfigured codepoint values, where a codepoint value of "0" may be used to indicate that every PUSCH transmission occasion 315 starting from the second PUSCH transmission occasion 315 in the CG period 320 is unused. Similarly, the control signaling 310 may indicate that a codepoint value of "1" may be used to indicate that every PUSCH transmission occasion 315 starting from the third PUSCH transmission occasion 315 in the CG period 320 is unused, and that a codepoint value of "2" may be used to indicate that every PUSCH transmission occasion 315 starting from the fourth PUSCH transmission occasion 315 in the CG period 320 is unused. In these examples, the UE 115-a may or may not be configured to count the earliest PUSCH transmission occasion 315-a within the CG period 320 in counts noted above in cases where it is assumed the UE 115-a will use the earliest PUSCH transmission occasion 315-a.

In some cases, the control signaling 310 may indicate or configure one or more data objects that define mappings between respective codepoint index values and corresponding sets of used/unused PUSCH transmission occasions 315. For example, in some cases, the control signaling 310 may indicate a data object illustrated in Table 1 below:

TABLE 1

Codepoints Indicating Unused CG-PUSCH Occasions

| Codepoint Index Value | Pattern ("1" indicates unused PUSCH occasion) |
|---|---|
| 0 | 0 0 0 1 |
| 1 | 0 0 1 1 |
| 2 | 0 1 0 1 |
| ... | ... |

Table 1 above indicates mappings between codepoint index values and corresponding patterns of unused PUSCH transmission occasions 315. For example, according to Table 1, a UCI message 330 that indicates codepoint index 0 may be used to indicate that the fourth PUSCH transmission occasion 315-d will be unused, where the first, second, and third PUSCH transmission occasions 315 will be used or not unused (where the term "not used" may refer unused occasions, as well as an unknown state).

In this regard, the control signaling 310 may indicate one or more parameters associated with UCI messages 330 used to indicate unused PUSCH transmission occasions 315. Other parameters that may be configured/indicated by the control signaling 310 may include, but are not limited to, a priority associated with UCI messages 330 used to indicate unused PUSCH transmission occasions 315, a control message format (e.g., UCI format, PUCCH format)) associated with UCI messages 330 used to indicate unused PUSCH transmission occasions 315, rules/conditions for multiplexing such UCI messages 330 with other types of messages, an offset (e.g., beta offset) for transmitting such UCI messages 330 within the PUSCH transmission occasions 315, and the like.

For example, in some cases, the control signaling may indicate whether UCI messages 330 indicating unused PUSCH transmission occasions 315 may be multiplexed with other UCI messages 330 on the PUSCH. In cases where UCI message 330 indicating unused PUSCH transmission occasions 315 may be multiplexed with other UCI messages 330, the control signaling 310 may configure a maximum quantity of separately encoded UCI messages 330 that may be multiplexed on a PUSCH (e.g., maximum of three UCI messages 330 may be multiplexed).

Moreover, in some cases, the control signaling 310 may indicate rules or conditions used to determine which existing UCI message 330 (e.g., which UCI formats) can be multiplexed with UCI messages 330 indicating unused PUSCH transmission occasions 315. For example, the control signaling 310 may include an RRC configuration that indicates whether the UE 115-a can multiplex UCI messages 330 indicating unused PUSCH transmission occasions 315 with HARQ feedback (e.g., ACK, NACK). If such multiplexing is allowed, UCI messages 330 indicating unused PUSCH transmission occasions 315 and HARQ-ACK feedback may be jointly encoded. Otherwise, if such multiplexing is not allowed, the UE 115-a may not transmit UCI messages 330 using PUSCH transmission occasion 315 that include HARQ feedback.

By way of another example, the control signaling 310 may indicate symbols on the PUSCH where UCI messages 330 indicating unused PUSCH transmission occasions 315 are mapped if a PUCCH resource collides with the PUSCH (e.g., resources mapped on the symbols starting after first DMRS symbol). Similarly, the control signaling 310 may indicate a beta-offset that is used to determine the number of resource elements used for UCI messages 330 if the UCI messages 330 are transmitted via PUSCH (e.g., control signaling 310 may indicate the same offset as the beta-offset used for HARQ-ACK on PUSCH).

In some cases, as will be described in further detail herein, the control signaling 310 may indicate various rules or conditions regarding whether the UE 115-a is to transmit UCI messages 330 indicating unused PUSCH transmission occasions 315 to one (or both) of the network entities 105-a, 105-b. Further, the control signaling 310 may indicate information regarding whether respective component carriers are enabled for unlicensed communications (e.g., NR-U), and the relationship between UCI messages 330 indicating unused PUSCH transmission occasions 315 and unlicensed communications (e.g., whether a component can support both NR-U communications and UCI messages 330 indicating unused PUSCH transmission occasions 315).

In some aspects, the UE 115-*a* may evaluate an uplink message buffer at the UE 115-*a*. In other words, the UE 115-*a* may evaluate how much uplink traffic (e.g., how much PUSCH traffic) the UE 115-*a* has to transmit within a message buffer maintained at the UE 115-*a*. In some aspects, the UE 115-*a* may evaluate the message buffer at 520 based on receiving the control signaling 310.

The UE 115-*a* may be configured to identify any conflicts between the PUSCH transmission occasions 315 of the uplink configured grant (e.g., CG-PUSCH configuration) and other sets of configured resources. In other words, the UE 115-*a* may determine whether the PUSCH transmission occasions 315 conflict with (e.g., overlap with) other semi-statically and/or dynamically configured resources reserved for other types of communications.

Specifically, the UE 115-*a* may be configured to refrain from transmitting CG-PUSCH messages 325 if such messages would collide or conflict with resources associated with a semi-static configuration and/or a dynamic indication or transmission. For example, the UE 115-*a* may identify a conflict between a PUSCH transmission occasion 315 (and therefore refrain from using the transmission occasion) if the PUSCH transmission occasion 315 conflicts with a downlink symbol in a semi-static TDD uplink/downlink configuration (e.g., tdd-UL-DL-ConfigurationCommon or tdd-UL-DL-ConfigurationDedicated), SSB symbol(s) (indicated by ssb-PositionsInBurst), symbol(s) indicated by pdcch-ConfigSIB1 in a master information block (MIB) for a CORESET for Type0-PDCCH CSS set, CLI measurement resources, or any combination thereof. In some aspects, the UE 115-*a* may be configured (and expected) to indicate PUSCH transmission occasions 315 within the CG period 320 that collide/conflict with resources of a semi-static configuration (as mentioned above) as being unused.

Additionally, or alternatively, the UE 115-*a* may be configured (and expected) to omit indicating PUSCH transmission occasions 315 within the CG period 320 that collide/conflict with resources of a semi-static configuration (as mentioned above) in UCI messages 330. In other words, in some cases, if a PUSCH transmission occasion 315 collides or conflicts with resources of a semi-static configuration, the UE 115-*a* may not indicate the respective PUSCH transmission occasions 315 via a UCI message 330 (as the resources of the semi-static configuration may already be known by the network). Such implementations may reduce signaling overhead of the UCI message 330.

Similarly, in the context of dynamic indications, the UE 115-*a* may identify a conflict between a PUSCH transmission occasion 315 (and therefore refrain from using the transmission occasion) if the PUSCH transmission occasion 315 conflicts with downlink reception scheduled by a dynamic grant (e.g., downlink message scheduled by DCI), downlink or flexible symbols indicated by SFI DCI, an uplink cancellation indications, or other higher-priority uplink transmissions. Further, the UE 115-*a* may identify a conflict if the CG-PUSCH transmission occasion follows in semi-static flexible symbols if the UE 115-*a* did not receive an SFI DCI indicating a format for the slot containing the symbols.

In some aspects, the UE 115-*a* may transmit one or more PUSCH messages 325 within one or more PUSCH transmission occasions 315 of the uplink configured grant (e.g., CG-PUSCH configuration). For example, in some implementations, the UE 115-*a* may be configured to transmit a PUSCH message 325 (including data from the message buffer) within at least the earliest configured PUSCH transmission occasion 315-*a* of the CG period 320.

Additionally, the UE 115-*a* may transmit, to the first network entity 105-*a*, the second network entity 105-*b*, or both, one or more UCI messages 330 that indicate one or more PUSCH transmission occasions 315 that will be unused by the UE 115-*a*. For example, as shown in FIG. 3, the UE 115-*a* may transmit a UCI message 330 indicating that the second PUSCH transmission occasion 315-*b* will be unused, either because of a size of the message buffer and/or because the second PUSCH transmission occasion 315-*b* overlaps with other reserved resources.

As noted previously herein, the UCI message 330 may indicate unused PUSCH transmission occasions 315 using one or more bit field values (e.g., codepoint, bitmap, etc.). For example, a single bit field value may indicate that the subsequent PUSCH transmission occasion 315 immediately following the UCI message 330 in the time domain will be unused, or that all PUSCH transmission occasions 315 following the UCI message 330 will be unused. By way of another example, the UCI message 330 may include a set of bit field values (e.g., bitmap, codepoint) that indicate which PUSCH transmission occasions 315 will be unused, as shown in Table 1 above, for example.

In some aspects, the UCI messages 330 indicating unused PUSCH transmission occasions 315 may be transmitted via an uplink control channel (e.g., PUCCH), via an uplink shared channel (e.g., CG-UCI transmitted via PUSCH), or both. For example, as shown in FIG. 3, the UE 115-*a* may be configured to transmit a UCI message 330 indicating unused PUSCH transmission occasions 315 before (or within) the first/earliest PUSCH transmission occasion 315-*a*. In such cases, the UE 115-*a* may be configured to transmit the UCI message 330 along with (e.g., multiplexed with) a PUSCH message 325 transmitted via the first PUSCH transmission occasion 315-*a*.

Figure 4:
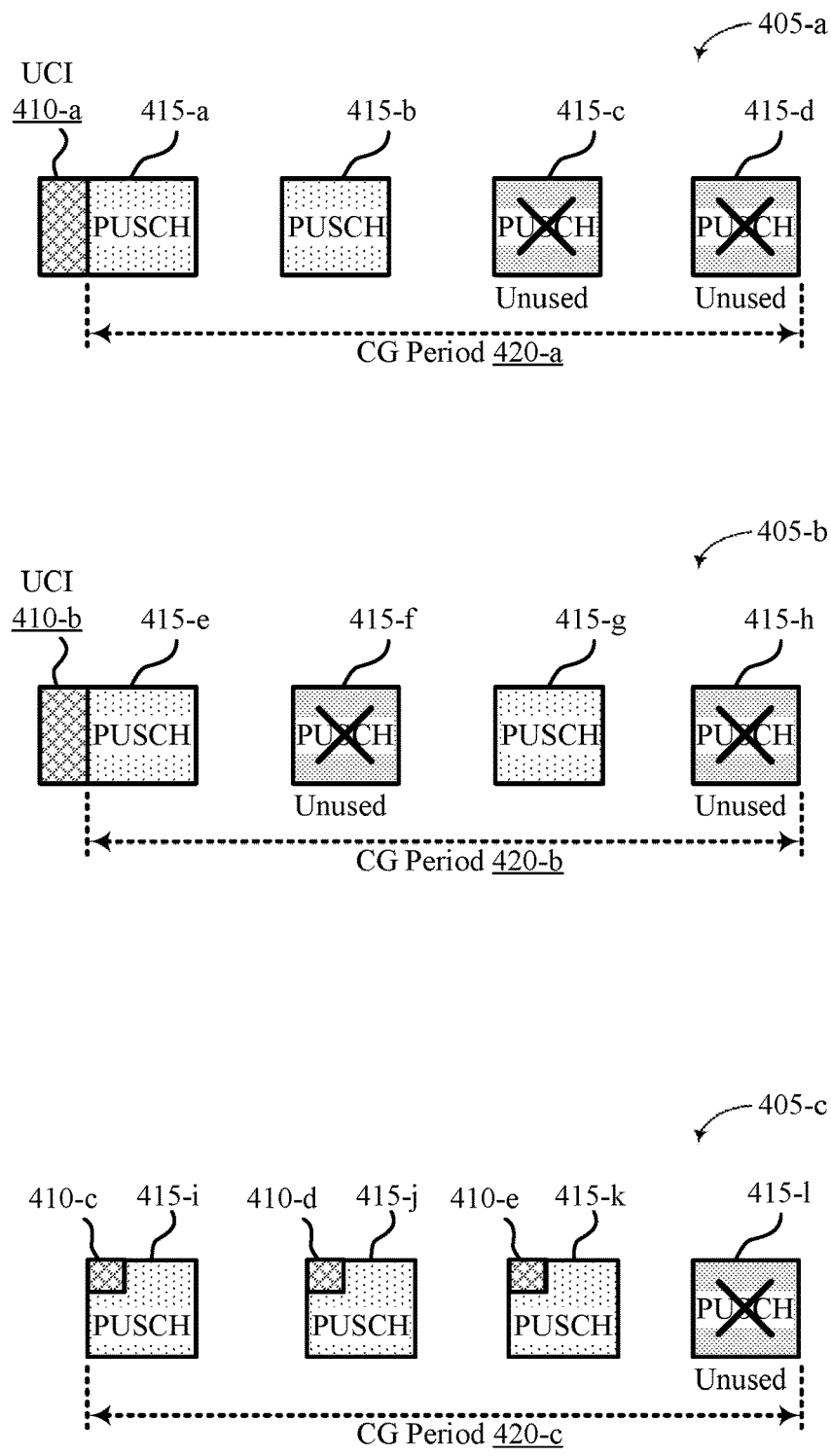
FIG. 4 illustrates an example of a resource configuration that supports techniques for indicating unused CG-PUSCH occasions in accordance with various aspects of the present disclosure.

By way of another example, as will be further shown and described in FIG. 4, the UE 115-*a* may be configured to transmit UCI messages 330 indicating unused PUSCH transmission occasions 315 within every PUSCH transmission occasion 315, or within only the used PUSCH transmission occasions 315. For a UCI message 330 transmitted via CG PUSCH, the UCI message 330 may be sent through CG-UCI. For an unused CG PUSCH transmission occasion 315, a new UCI message 330 may be sent.

As such, the UE 115-*a* may be configured to transmit the UCI message 330(*s*) indicating unused PUSCH transmission occasions 315 in accordance with the sets of resources, data objects (e.g., mappings), and/or parameters/characteristics indicated via the control signaling 310 (e.g., configured UCI format, UCI priority, etc.). For example, as noted previously herein, the control signaling 310 may indicate resources that are to be used to communicate the UCI message 330(*s*) (e.g., whether UCI messages 330 are to be communicated via PUCCH and/or PUSCH, whether UCI messages 330 are to be communicated before or within PUSCH transmission occasions 315, etc.).

Moreover, the UE 115-*a* may be configured to transmit the UCI messages 330 to the first network entity 105-*a*, the second network entity 105-*b*, or both, based on the rules/conditions configured via the control signaling 310. Specifically, when multiple TRPs are enabled for uplink transmissions within the CG period 320, there are several different options for transmitting UCI messages 330 indicating unused PUSCH transmission occasions 315 within the CG period 320.

In accordance with a first option, UCI messages 330 are transmitted to both TRPs (e.g., both network entities 105-a, 105-b), where the UCI messages 330 indicate unused PUSCH transmission occasions 315 for the respective TRPs (e.g., UCI messages 330 transmitted to the first network entity 105-a indicate unused PUSCH transmission occasions 315 associated with the first network entity 105-a, and UCI messages 330 transmitted to the second network entity 105-b indicate unused PUSCH transmission occasions 315 associated with the second network entity 105-b). In accordance with a second option, UCI messages 330 are sent to only one TRP (e.g., only to the first network entity 105-a or the network entity 105 from which the UE receives scheduling information in DCI), where the UCI messages 330 indicate unused PUSCH transmission occasions 315 associated with both TRPs. In accordance with a third option, UCI messages 330 are transmitted to both TRPs (e.g., to both network entities 105-a, 105-b), where the UCI messages 330 indicate unused PUSCH transmission occasions for both TRPs.

In this regard, in some cases, the UE 115-a may be configured to transmit the UCI messages 330 to both network entities 105 regardless of whether the unused PUSCH transmission occasions 315 are associated with the first network entity 105-a or the second network entity 105-b. In other cases, the UE 115-a may be configured to transmit the UCI message 330(s) only to the network entity 105 that is associated with the unused PUSCH transmission occasions 315.

In some aspects, the UE 115-a may be configured to transmit the UCI message(s) 330 via one or more component carriers based on whether or not the respective component carriers support both unlicensed communications (e.g., NR-U) and UCI messages 330 indicating unused PUSCH transmission occasions 315.

Specifically, the control signaling 310 (and/or additional control signaling) may indicate which carriers are enabled with unlicensed communications, and whether the respective carriers can simultaneously support unlicensed communications and UCI messages 330 described herein. When NR-U is enabled on a carrier, there is no need to skip CG PUSCH transmission occasions 315, as doing so may create a gap resulting in additional Listen-Before-Talk (LBT) operation(s).

For example, in some cases, unlicensed communications (e.g., NR-U communications) and UCI messages 330 indicating unused PUSCH transmission occasion(s) 315 may not be supported together on the same carrier. In such cases, the UE 115-a may be configured to transmit UCI messages 330 via carriers that are not enabled with NR-U. Otherwise, if unlicensed communications (e.g., NR-U communications) and UCI messages 330 indicating unused PUSCH transmission occasion(s) 315 are supported on the same carrier, the UCI messages 330 may be transmitted via CG-UCI in PUSCH. In such cases, if NR-U is not enabled for a respective carrier, the CG-UCI (UCI message 330) may include bits for information related to unused PUSCH transmission occasion(s) 315 (but no information for unlicensed communications). Conversely, if NR-U is enabled for a carrier, bit(s) related to the unused PUSCH transmission occasion(s) 315 may be added to the CG-UCI that includes bits for NR-U communications.

Subsequently, the UE 115-a may communicate with the first network entity 105-a, the second network entity 105-b, or both. Specifically, the UE 115-a may communicate with the respective devices using the remaining PUSCH transmission occasions 315 (if any), and may refrain from transmitting PUSCH messages 325 within the unused PUSCH transmission occasions 315 indicated via the UCI message(s) 330.

In some cases, the UE 115-a may be able to transmit other types of messages that overlap with the unused PUSCH transmission occasions 315 in the time domain, the frequency domain, or both. For example, in some cases, the UE 115-a may be configured to transmit PUCCH messages using PUCCH resources that overlap with the PUSCH transmission occasions 315 in the time/frequency domain. Moreover, in some cases, the UE 115-a may be able to skip PUSCH transmission occasions 315 (e.g., refrain from transmitting messages if the UE 115-a has no uplink data in the message buffer) that were not indicated as being unused by the UCI message 330. For example, the UE 115-a may skip the fourth PUSCH transmission occasion 315-d even though the UCI message 330 did not indicate the fourth PUSCH transmission occasion 315-d as being unused.

Techniques described herein may enable the UE 115-a to dynamically indicate which PUSCH transmission occasions 315 will go unused by the UE 115-a, either because of a lack of data to be transmitted within a message buffer at the UE 115-a, or because the unused PUSCH transmission occasions 315 conflict with other configured/reserved resources. As such, by enabling the UE 115-a to dynamically indicate which PUSCH transmission occasions 315 will be unused, techniques described herein may enable the network to reallocate unused PUSCH transmission occasions 315 to other devices and/or for other types of communications. As such, techniques described herein may lead to more efficient resource utilization within the wireless communications system 300.

FIG. 4 illustrates an example of a resource configuration 400 that supports techniques for indicating unused CG-PUSCH occasions in accordance with various aspects of the present disclosure. Aspects of the resource configuration 400 may implement, or be implemented by, aspects of wireless communications system 100, the network architecture 200, the wireless communications system 300, or any combination thereof.

For example, the resource configuration 400 includes different CG-PUSCH configurations 405-a, 405-b, and 405-c that illustrate different examples of how a UE 115 may dynamically indicate unused PUSCH occasions, as described herein.

For example, the first CG-PUSCH configuration 405-a may include a set of PUSCH transmission occasions 415-a, 415-b, 415-c, and 415-d within a CG period 420-a. In this example, a UE 115 may determine that the third PUSCH transmission occasion 415-c and the fourth PUSCH transmission occasion 415-d will be unused (e.g., either due to a lack of uplink data to be transmitted, or due to the PUSCH transmission occasions 415-c, 415-d conflicting with other reserved resources). As such, in this example, the UE 115 may transmit a UCI message 410-a that indicates the third PUSCH transmission occasion 415-c and the fourth PUSCH transmission occasion 415-d will be unused. For instance, the UCI message 410-a may include a codepoint index value of "1" which indicates that every PUSCH transmission occasion 415 within the CG period 420-a starting from the third PUSCH transmission occasion 415-c will be unused.

By way of another example, the second CG-PUSCH configuration 405-b may include a set of PUSCH transmission occasions 415-e, 415-f, 415-g, and 415-h within a CG period 420-b. In this example, a UE 115 may determine that the second PUSCH transmission occasion 415-f and the fourth PUSCH transmission occasion 415-h will be unused.

As such, in this example, the UE 115 may transmit a UCI message 410-*b* that indicates the second PUSCH transmission occasion 415-*f* and the fourth PUSCH transmission occasion 415-*d* will be unused. For instance, the UCI message 410-*b* may include a codepoint index value of "2" from Table 1 above (e.g., codepoint index 2=0 1 0 1) which indicates that the second PUSCH transmission occasion 415-*f* and the fourth PUSCH transmission occasion 415-*h* will be unused.

By way of another example, the third CG-PUSCH configuration 405-*c* may include a set of PUSCH transmission occasions 415-*i*, 415-*j*, 415-*k*, and 415-1 within a CG period 420-*c*. As shown in the third CG-PUSCH configuration 405-*c*, the UE 115 may be configured to transmit a UCI message 410 within every PUSCH transmission occasion 415 within the CG period 420-*c*. In some cases, the UE 115 may be configured to transmit a UCI message 410 within a PUSCH transmission occasion 415 only if a PUSCH message is also transmitted within the respective PUSCH transmission occasion 415 (e.g., the UE 115 does not transmit a UCI message within unused PUSCH transmission occasions 415). Alternatively, the UE 115 may be configured to transmit a UCI message 410 within each PUSCH transmission occasion 415 regardless of whether a PUSCH message is transmitted within the respective PUSCH transmission occasion 415 (e.g., the UE 115 transmits UCI messages 410 within both used and unused PUSCH transmission occasions 415). In other cases, it may be up to UE 115 implementation to determine where UCI messages 410 are transmitted.

Continuing with reference to the third CG-PUSCH configuration 405-*c*, the UE 115 may transmit UCI messages 410-*c*, 410-*d*, and 410-*e* within each of the PUSCH transmission occasions 415-*i*, 415-*j*, 415-*k*. In some aspects, if UCI messages 410 are transmitted multiple times within the CG period 420-*c*, information (e.g., indications of unused PUSCH transmission occasions 415) within a new UCI message 410 may override or overwrite information from previous UCI messages 410. For example, in some implementations, each of the UCI messages 410-*c*, 410-*d*, 410-*e* (e.g., CG-UCIs) may include a single bit field value, where a bit field value of "1" indicates that every PUSCH transmission occasion 415 after the current PUSCH transmission occasion 415 will be unused (but where a bit value of "0" does not necessarily mean the subsequent PUSCH transmission occasions will be used). As such, the first UCI message 410-*c* and the second UCI message 410-*d* may include bit field values of "0," where the third UCI message 410-*e* may include a bit field value of "1" indicating that all subsequent PUSCH transmission occasions 415 within the CG period 420-*c* are unused.

Alternatively, in cases where multiple UCI messages 410 are transmitted within the CG period 420-*c*, the information within each of the UCI messages 410 may be expected to include consistent content. For example, referring to the third CG-PUSCH configuration 405-*c*, each of the UCI messages 410-*c*, 410-*d*, 410-*e* may indicate codepoint index value "0" from Table 1 above (e.g., codepoint index 0=0 0 0 1) which indicates that the fourth PUSCH transmission occasion 415-1 will be unused.

Figure 5:
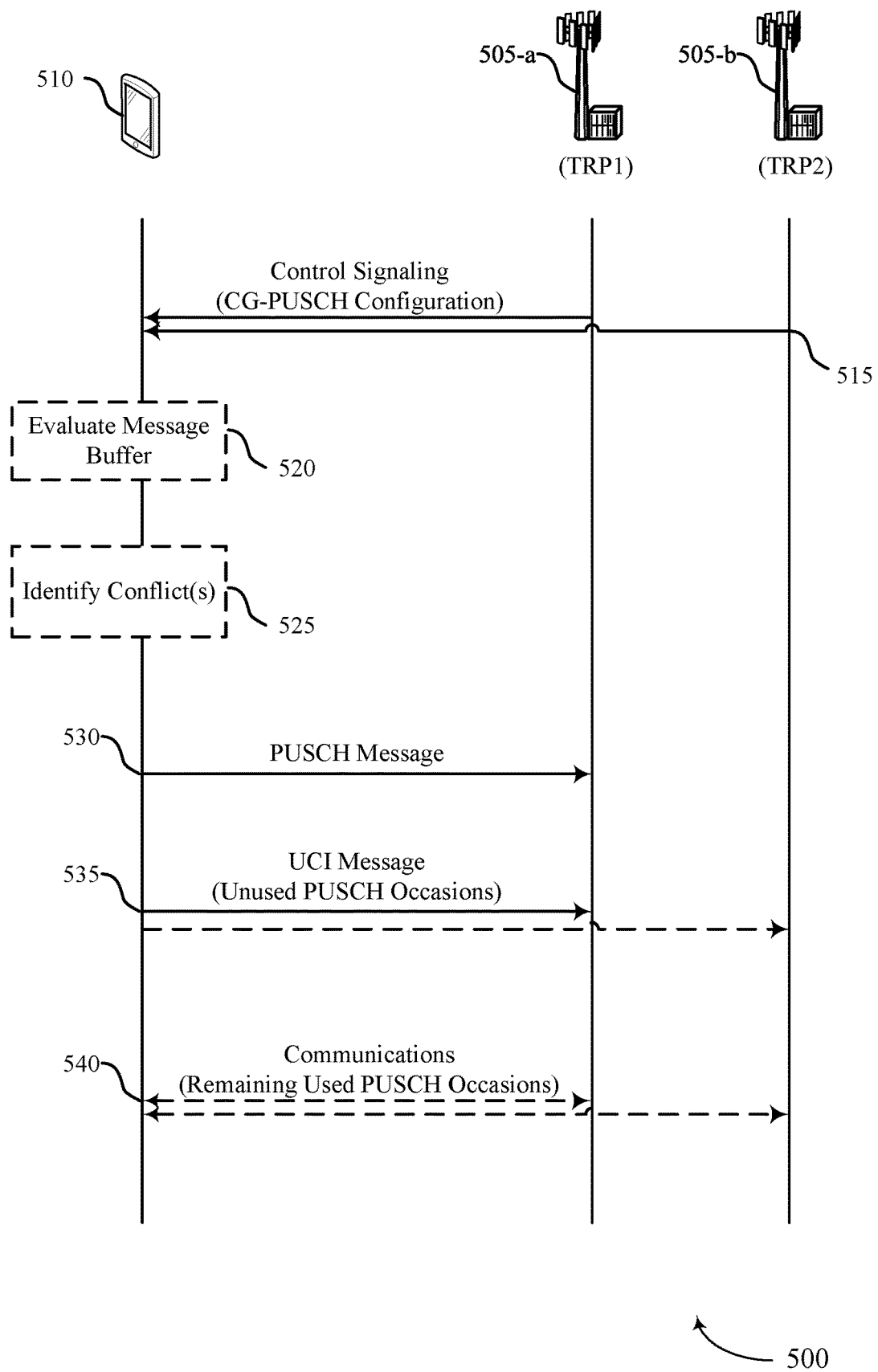
FIG. 5 illustrates an example of a process flow that supports techniques for indicating unused CG-PUSCH occasions in accordance with various aspects of the present disclosure.

FIG. 5 illustrates an example of a process flow 500 that supports techniques for indicating unused CG-PUSCH occasions in accordance with various aspects of the present disclosure. Aspects of the process flow 500 may implement, or be implemented by, aspects of wireless communications system 100, the network architecture 200, the wireless communications system 300, the resource configuration 400, or any combination thereof. For example, the process flow 500 illustrates signaling that enables a UE 510 to dynamically indicate unused CG-PUSCH occasions, as described previously herein.

The process flow 500 includes a UE 510, a first network entity 505-*a*, and a second network entity 505-*b*, which may be examples of UEs 115, network entities 105, and other wireless devices as described herein. For example, the UE 510, the first network entity 505-*a*, and the second network entity 505-*b* illustrated in FIG. 5 may include examples of the UE 115-*a*, the first network entity 105-*a*, and the second network entity 105-*b*, respectively, as illustrated in FIG. 3. In this regard, the first network entity 505-*a* and the second network entity 505-*b* may include separate network nodes or devices, or may include TRPs of one or more network nodes/devices. For instance, the first network entity 505-*a* may include an example of a first TRP (e.g., TRP1) associated with a network entity/node, and the second network entity 505-*b* may include an example of a second TRP (e.g., TRP2) associated with the network entity/node.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 515, the UE 510 may receive, from the first network entity 505-*a* (e.g., TRP1), the second network entity 505-*b* (e.g., TRP2), or both, control signaling indicating an uplink configured grant including a set of uplink shared channel transmission occasions usable by the UE 510. In other words, the UE 510 may receive signaling indicating a CG-PUSCH configuration that includes multiple PUSCH transmission occasions usable by the UE 510 for transmitting PUSCH messages. In some cases, the uplink configured grant may indicate a first subset of PUSCH transmission occasions usable for transmitting PUSCH messages to the first network entity 505-*a* (e.g., first TRP), and a second subset of PUSCH transmission occasions usable for transmitting PUSCH messages to the second network entity 505-*b* (e.g., second TRP).

In some implementations, the control signaling at 515 (and/or other control signaling) may additionally configure other sets of resources at the UE 510 that may overlap or otherwise conflict with the PUSCH transmission occasions. For example, the control signaling may indicate a resource configuration (e.g., semi-static configuration, dynamic configuration) that includes a set of resources reserved for communications between the UE 510 and the network entities 505. In this regard, the control signaling (and/or additional control signaling) may include RRC signaling, DCI signaling, MAC-CE signaling, and the like.

For instance, in the context of a semi-static configuration, the set of resources may include a set of downlink symbols of a TDD configuration, SSB resources, a CORESET (e.g., CORESET for a Type0 PDCCH CSS set), resources of a search space, a set of CLI measurement resources, and the like. Comparatively, in the context of a dynamic configuration, the set of resources may include resources for a downlink reception scheduled by a dynamic grant, a downlink or flexible symbol indicated by SFI DCI, resources for other higher-priority uplink transmissions, and the like.

In some implementations, the control signaling may indicate other parameters or characteristics associated with the CG-PUSCH configuration that enable the UE 510 to indicate unused PUSCH transmission occasions. For example, in some cases, the control signaling may indicate sets of resources that are to be used by the UE 510 to transmit UCI messages indicating unused PUSCH transmission occasions. In other words, the control signaling may indicate whether the UE 510 is to transmit a single UCI message indicating unused PUSCH transmission occasions, whether the UE 510 is to transmit a UCI message indicating unused PUSCH transmission occasions within each PUSCH transmission occasion (or each used PUSCH transmission occasion), and the like.

Moreover, in some aspects, the control signaling may mappings, rules, or other conditions that indicate how unused PUSCH transmission occasions are to be indicated via UCI messages. For example, the control signaling may indicate one or more data objects that indicate or includes sets of mappings between sets of PUSCH transmission occasions and corresponding sets of bit field values (e.g., codepoints). For example, the control signaling may indicate Table 1 above which maps different codepoint values to respective sets of PUSCH transmission occasions that may be indicated as unused.

In this regard, the control signaling may indicate one or more parameters associated with UCI messages used to indicate unused PUSCH transmission occasions. Other parameters that may be configured/indicated by the control signaling may include, but are not limited to, a priority associated with UCI messages used to indicate unused PUSCH transmission occasions, a control message format (e.g., UCI format) associated with UCI messages used to indicate unused PUSCH transmission occasions, rules/conditions for multiplexing such UCI messages with other types of messages, an offset (e.g., beta offset) for transmitting such UCI messages within the PUSCH transmission occasions, and the like.

In some cases, as described previously herein, the control signaling may indicate various rules or conditions regarding whether the UE 510 is to transmit UCI messages indicating unused PUSCH transmission occasions to one (or both) of the network entities 505-*a*, 505-*b*. Further, the control signaling may indicate information regarding whether respective component carriers are enabled for unlicensed communications (e.g., NR-U), and the relationship between UCI messages indicating unused PUSCH transmission occasions and unlicensed communications (e.g., whether a component can support both NR-U communications and UCI messages indicating unused PUSCH transmission occasions).

At 520, the UE 510 may evaluate an uplink message buffer at the UE 510. In other words, the UE 510 may evaluate how much uplink traffic (e.g., how much PUSCH traffic) the UE 510 has to transmit within a message buffer maintained at the UE 510. In some aspects, the UE 510 may evaluate the message buffer at 520 based on receiving the control signaling at 515.

At 525, the UE 510 may identify any conflicts between the PUSCH transmission occasions of the uplink configured grant (e.g., CG-PUSCH configuration) and other sets of configured resources. In other words, the UE 510 may determine whether the PUSCH transmission occasions conflict with (e.g., overlap with) other semi-statically and/or dynamically configured resources reserved for other types of communications. For example, the UE 510 may determine whether any PUSCH transmission occasions conflict with resources reserved via a semi-static configuration, such as resources for SSB messages, resources of a CORESET (e.g., CORESET for Type0-PDCCH CSS), CLI measurement resources, and the like. As such, the UE 510 may determine whether any conflict(s) exist at 525 based on receiving the control signaling at 515, evaluating the message buffer at 520, or both.

At 530, the UE 510 may transmit one or more PUSCH messages within one or more PUSCH transmission occasions of the uplink configured grant (e.g., CG-PUSCH configuration). For example, in some implementations, the UE 510 may be configured to transmit a PUSCH message (including data from the message buffer) within at least the earliest configured PUSCH transmission occasion. As such, the UE 510 may be configured to transmit the one or more PUSCH messages at 530 based on receiving the control signaling at 515, evaluating the message buffer at 520, identifying the existence of any conflicts at 525, or any combination thereof.

At 535, the UE 510 may transmit, to the first network entity 505-*a*, the second network entity 505-*b*, or both, one or more UCI messages that indicate one or more PUSCH transmission occasions that will be unused by the UE 510. For example, in cases where the UE 510 has only a small amount of data to be transmitted in the message buffer, the UE 510 may determine that it will not use all the configured PUSCH transmission occasions to transmit the data, and may transmit the UCI message(s) indicating the unused PUSCH transmission occasions. By way of another example, the UE 510 may determine that one or more PUSCH transmission occasions conflict with other sets of reserved resources (e.g., overlap with other resources in the time/frequency domain), and may thereby indicate (via the UCI message(s)) that such conflicting PUSCH transmission occasions will be unused. As such, the UE 510 may transmit the one or more UCI messages indicating unused PUSCH transmission occasions at 535 based on receiving the control signaling at 515, evaluating the message buffer at 520, identifying the existence of any conflicts at 525, transmitting the PUSCH message(s) at 530, or any combination thereof.

In some aspects, the UCI messages indicating unused PUSCH transmission occasions may be transmitted via an uplink control channel (e.g., PUCCH), via an uplink shared channel (e.g., PUSCH), or both. For example, as shown in FIG. 3, the UE 510 may be configured to transmit a UCI message indicating unused PUSCH transmission occasions before (or within) the first PUSCH transmission occasion. In such cases, the UE 510 may be configured to transmit the UCI message at 535 along with (e.g., multiplexed with) the PUSCH message at 530. By way of another example, as shown in FIG. 4, the UE 510 may be configured to transmit UCI messages indicating unused PUSCH transmission occasions within every PUSCH transmission occasion, or within only the used PUSCH transmission occasions.

As such, the UE 510 may be configured to transmit the UCI message(s) indicating unused PUSCH transmission occasions in accordance with the sets of resources, data objects (e.g., mappings), and/or parameters/characteristics indicated via the control signaling at 515 (e.g., configured UCI format, UCI priority, etc.). For example, as noted previously herein, the control signaling may indicate resources that are to be used to communicate the UCI message(s) at 535 (e.g., whether UCI messages are to be communicated via PUCCH and/or PUSCH, whether UCI messages are to be communicated before or within PUSCH transmission occasions, etc.).

The UCI messages may include one or more bit field values that indicate which PUSCH transmission occasions will be unused. For example, a single bit field value may indicate that the subsequent PUSCH transmission occasion immediately following the UCI message in the time domain will be unused, or that all PUSCH transmission occasions following the UCI message will be unused. By way of another example, the UCI message may include a set of bit field values (e.g., bitmap, codepoint) that indicate which PUSCH transmission occasions will be unused, as shown in Table 1 above, for example.

Moreover, the UE 510 may be configured to transmit the UCI messages to the first network entity 505-*a*, the second network entity 505-*b*, or both, based on the rules/conditions configured at 515. For example, the UE 510 may be configured to transmit the UCI messages to both network entities 505 regardless of whether the unused PUSCH transmission occasions are associated with the first network entity 505-*a* or the second network entity 505-*b*. In other cases, the UE 510 may be configured to transmit the UCI message(s) only to the network entity 505 that is associated with the unused PUSCH transmission occasions.

At 540, the UE 510 may communicate with the first network entity 505-*a*, the second network entity 505-*b*, or both. In particular, the UE 510 may communicate with the respective devices using the remaining PUSCH transmission occasions (if any), and may refrain from transmitting PUSCH messages within the unused PUSCH transmission occasions indicated at 535.

In some cases, the UE 510 may be able to transmit other types of messages that overlap with the unused PUSCH transmission occasions in the time domain, the frequency domain, or both. For example, in some cases, the UE 510 may be configured to transmit PUCCH messages using PUCCH resources that overlap with the PUSCH transmission occasions in the time/frequency domain.

Figure 6:
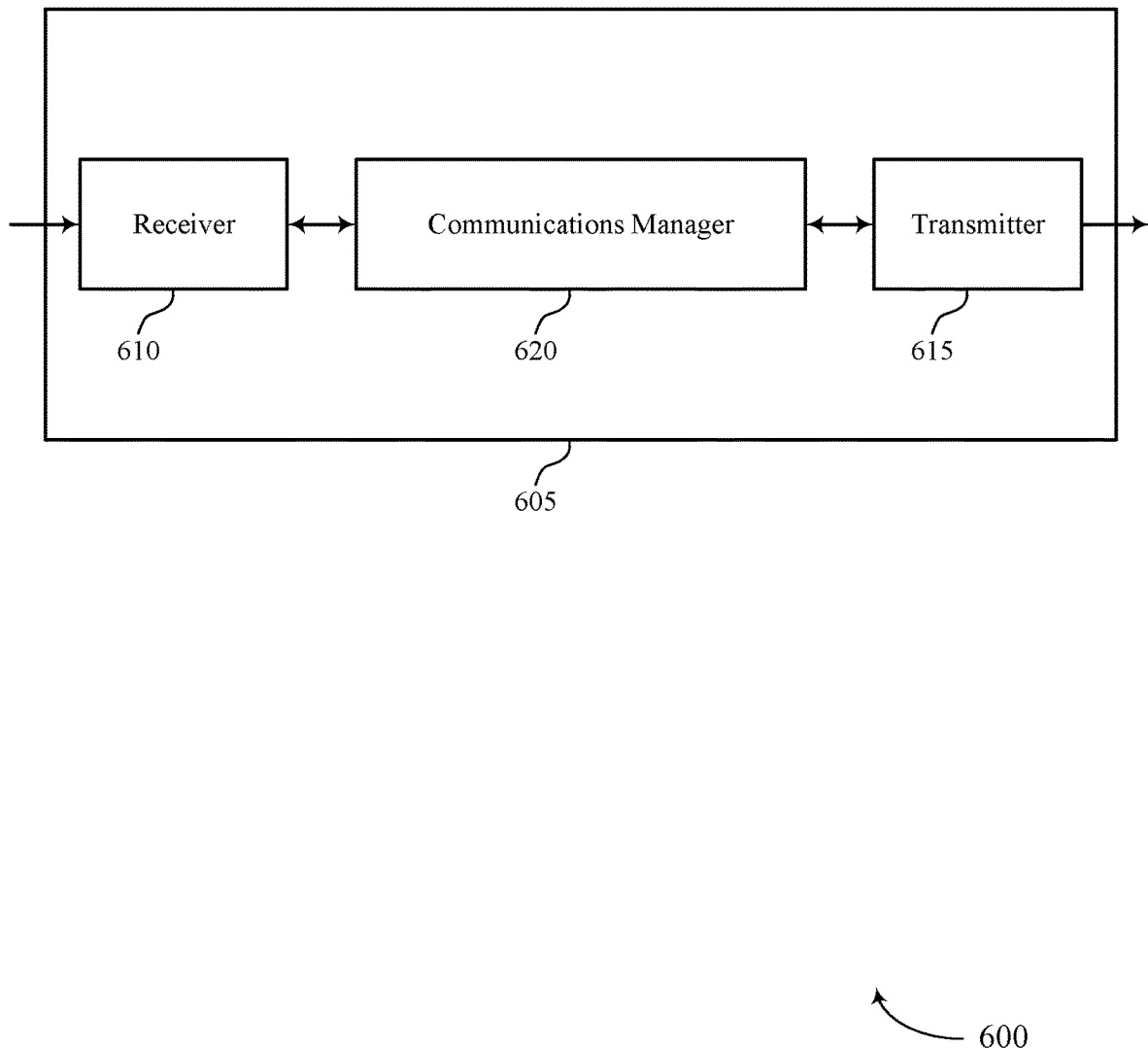
FIGS. 6 and 7 illustrate block diagrams of devices that support techniques for indicating unused CG-PUSCH occasions in accordance with various aspects of the present disclosure.

FIG. 6 illustrates a block diagram 600 of a device 605 that supports techniques for indicating unused CG-PUSCH occasions in accordance with various aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for indicating unused CG-PUSCH occasions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for indicating unused CG-PUSCH occasions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for indicating unused CG-PUSCH occasions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

For example, the communications manager 620 may be configured as or otherwise support a means for receiving control signaling indicating an uplink configured grant including a set of multiple uplink shared channel transmission occasions within a period of the uplink configured grant usable by the UE. The communications manager 620 may be configured as or otherwise support a means for transmitting, in response to receiving the control signaling, an uplink shared channel message within a first uplink shared channel transmission occasion of the set of multiple uplink shared channel transmission occasions. The communications manager 620 may be configured as or otherwise support a means for transmitting a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both. The communications manager 620 may be configured as or otherwise support a means for communicating with a network entity based on transmitting the UCI message, where the communicating includes refraining from transmitting messages within the second uplink shared channel transmission occasion.

By including or configuring the communications manager 620 in accordance with examples as described herein, the device 605 (e.g., a processor controlling or otherwise coupled with the receiver 610, the transmitter 615, the communications manager 620, or a combination thereof) may support techniques that enable UEs 115 to dynamically indicate which PUSCH occasions will go unused by the UE 115, either because of a lack of data to be transmitted within a message buffer at the UE 115, or because the unused PUSCH occasions conflict with other configured resources. As such, by enabling UEs 115 to dynamically indicate which PUSCH occasions will be unused, techniques described herein may enable the network to reallocate unused PUSCH occasions to other devices and/or for other types of communications. As such, techniques described herein may lead to more efficient resource utilization within a wireless communications system.

Figure 7:
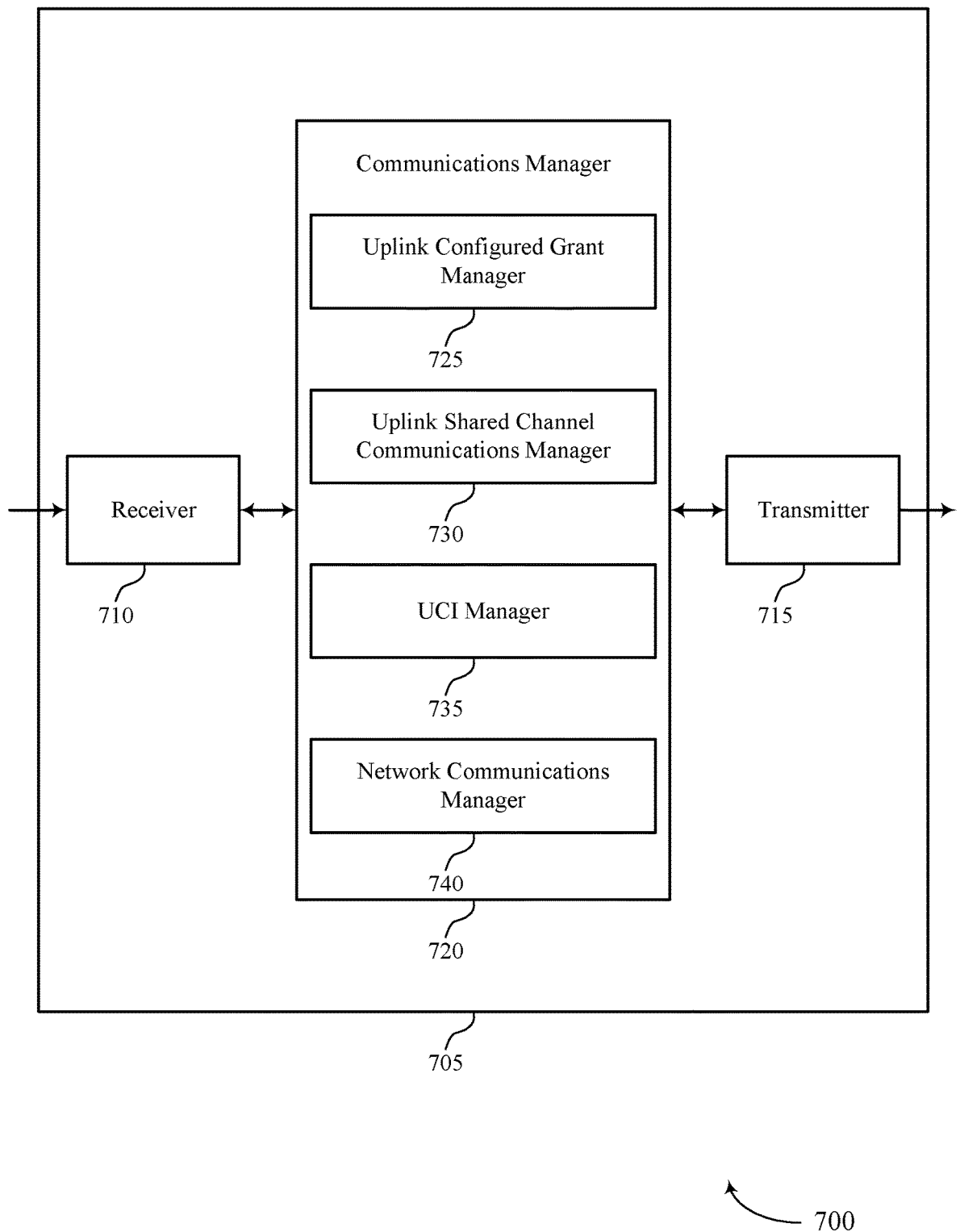

FIG. 7 illustrates a block diagram 700 of a device 705 that supports techniques for indicating unused CG-PUSCH occasions in accordance with various aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for indicating unused CG-PUSCH occasions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for indicating unused CG-PUSCH occasions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for indicating unused CG-PUSCH occasions as described herein. For example, the communications manager 720 may include an uplink configured grant manager 725, an uplink shared channel communications manager 730, a UCI manager 735, a network communications manager 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The uplink configured grant manager 725 may be configured as or otherwise support a means for receiving control signaling indicating an uplink configured grant including a set of multiple uplink shared channel transmission occasions within a period of the uplink configured grant usable by the UE. The uplink shared channel communications manager 730 may be configured as or otherwise support a means for transmitting, in response to receiving the control signaling, an uplink shared channel message within a first uplink shared channel transmission occasion of the set of multiple uplink shared channel transmission occasions. The UCI manager 735 may be configured as or otherwise support a means for transmitting a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both. The network communications manager 740 may be configured as or otherwise support a means for communicating with a network entity based on transmitting the UCI message, where the communicating includes refraining from transmitting messages within the second uplink shared channel transmission occasion.

Figure 8:
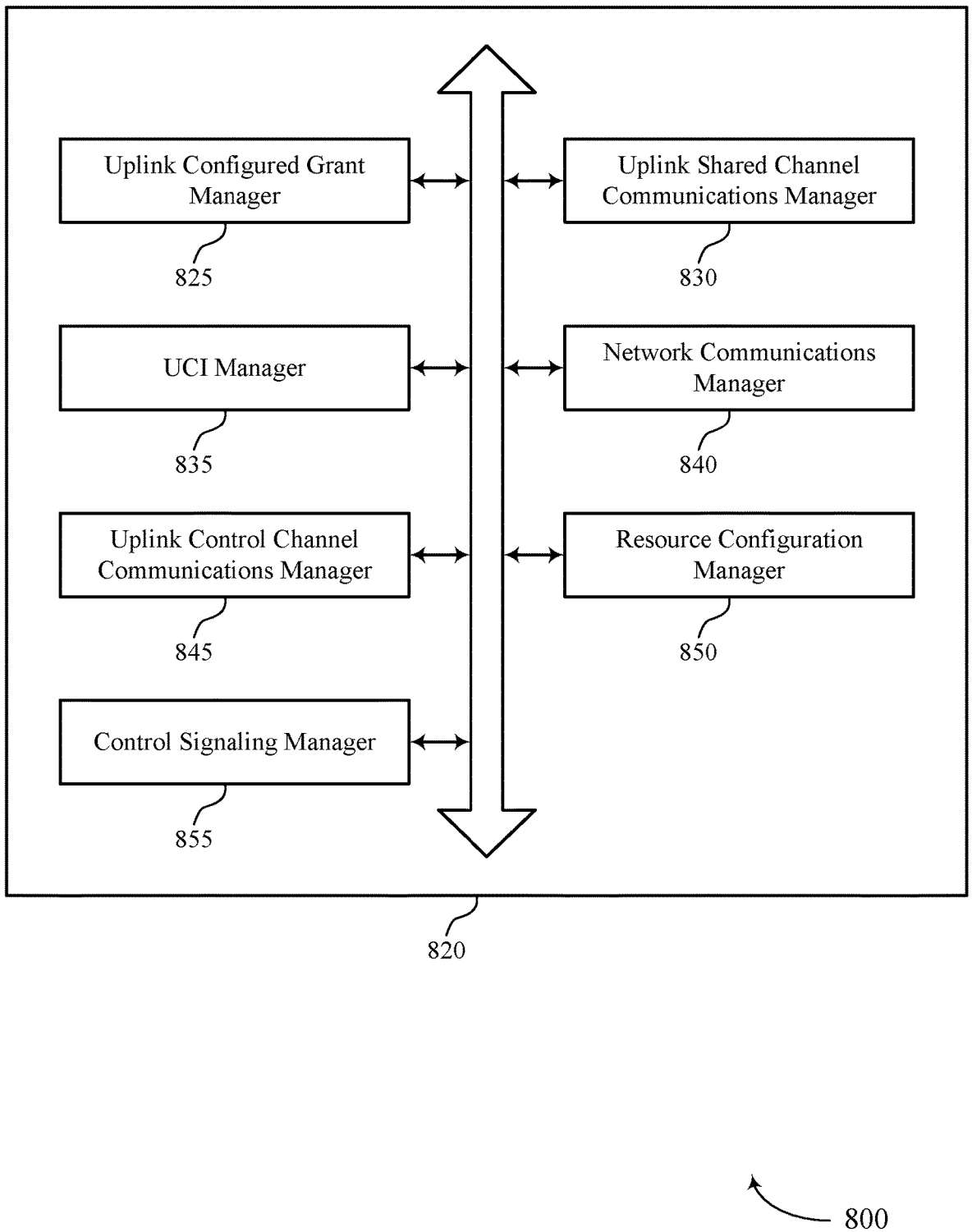
FIG. 8 illustrates a block diagram of a communications manager that supports techniques for indicating unused CG-PUSCH occasions in accordance with various aspects of the present disclosure.

FIG. 8 illustrates a block diagram 800 of a communications manager 820 that supports techniques for indicating unused CG-PUSCH occasions in accordance with various aspects of the present disclosure. The communications manager 820 may be an example of aspects of a communications manager 620, a communications manager 720, or both, as described herein. The communications manager 820, or various components thereof, may be an example of means for performing various aspects of techniques for indicating unused CG-PUSCH occasions as described herein. For example, the communications manager 820 may include an uplink configured grant manager 825, an uplink shared channel communications manager 830, a UCI manager 835, a network communications manager 840, an uplink control channel communications manager 845, a resource configuration manager 850, a control signaling manager 855, or any combination thereof. Each of these components may communicate, directly or indirectly, with one another (e.g., via one or more buses).

The uplink configured grant manager 825 may be configured as or otherwise support a means for receiving control signaling indicating an uplink configured grant including a set of multiple uplink shared channel transmission occasions within a period of the uplink configured grant usable by the UE. The uplink shared channel communications manager 830 may be configured as or otherwise support a means for transmitting, in response to receiving the control signaling, an uplink shared channel message within a first uplink shared channel transmission occasion of the set of multiple uplink shared channel transmission occasions. The UCI manager 835 may be configured as or otherwise support a means for transmitting a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both. The network communications manager 840 may be configured as or otherwise support a means for communicating with a network entity based on transmitting the UCI message, where the communicating includes refraining from transmitting messages within the second uplink shared channel transmission occasion.

In some examples, to support communicating with the network entity, the uplink control channel communications manager 845 may be configured as or otherwise support a means for transmitting an uplink control channel message that at least partially overlaps with the second uplink shared channel transmission occasion in a time domain, a frequency domain, or both.

In some examples, the resource configuration manager 850 may be configured as or otherwise support a means for receiving, via the control signaling, additional control signaling, or both, a resource configuration including the set of reserved resources allocated for communications between the network entity and the UE. In some examples, the uplink configured grant manager 825 may be configured as or otherwise support a means for identifying that the second uplink shared channel transmission occasion will be unused based on the second uplink shared channel transmission occasion overlapping with the set of reserved resources in a time domain, a frequency domain, or both, where transmitting the UCI message is based on the identifying.

In some examples, the set of reserved resources include a set of downlink symbols of a TDD configuration, a set of SSB resources, a CORESET, a search space, a set of CLI measurement resources, or any combination thereof.

In some examples, the UCI message is transmitted via an uplink control channel, via the set of multiple uplink shared channel transmission occasions, or both.

In some examples, to support transmitting the UCI message, the UCI manager 835 may be configured as or otherwise support a means for transmitting the UCI message including a set of bit field values indicating a set of uplink shared channel transmission occasions including the second uplink shared channel transmission occasion will be unused, where the set of bit field values include a codepoint, a bitmap, or both.

In some examples, the control signaling manager 855 may be configured as or otherwise support a means for receiving, via the control signaling, additional control signaling, or both, a data object indicating a set of mappings between sets of uplink shared channel transmission occasions and corresponding sets of bit field values, where the set of bit field values corresponds to a mapping of the set of mappings that is associated with the set of uplink shared channel transmission occasions.

In some examples, to support transmitting the UCI message, the UCI manager 835 may be configured as or otherwise support a means for transmitting the UCI message including a single bit field value indicating that a subsequent uplink shared channel transmission occasion following the UCI message will be unused, where the subsequent uplink shared channel transmission occasion includes the second uplink shared channel transmission occasion.

In some examples, to support transmitting the UCI message, the UCI manager 835 may be configured as or otherwise support a means for transmitting the UCI message including a single bit field value indicating that all uplink shared channel transmission occasions of the set of multiple uplink shared channel transmission occasions following the UCI message will be unused.

In some examples, the UCI manager 835 may be configured as or otherwise support a means for receiving, via the control signaling, an indication of a set of resources allocated for UCI messages indicating unused uplink shared channel transmission occasions, where the UCI messages is transmitted within the set of resources.

In some examples, to support transmitting the UCI message, the UCI manager 835 may be configured as or otherwise support a means for transmitting the UCI message prior to an earliest uplink shared channel transmission occasion of the set of multiple uplink shared channel transmission occasions, or within the earliest uplink shared channel transmission occasion.

In some examples, to support transmitting the UCI message, the UCI manager 835 may be configured as or otherwise support a means for transmitting a set of multiple UCI messages within the set of multiple uplink shared channel transmission occasions, where each UCI message of the set of multiple UCI messages indicates one or more unused uplink shared channel transmission occasions.

In some examples, the UCI manager 835 may be configured as or otherwise support a means for receiving, via the control signaling, an indication of one or more parameters associated with the UCI message, where the UCI message is transmitted in accordance with the one or more parameters, and where the one or more parameters include a priority associated the UCI message, a control message format of associated with the UCI message, a condition for multiplexing the UCI message with other types of messages, an offset for transmitting the UCI message within an uplink shared channel transmission occasion of the set of multiple uplink shared channel transmission occasions, or any combination thereof.

In some examples, the UCI manager 835 may be configured as or otherwise support a means for transmitting the UCI message to both the first TRP and the second TRP.

In some examples, the UCI manager 835 may be configured as or otherwise support a means for transmitting the UCI message only to the first TRP based on the second uplink shared channel transmission occasion being included within the first subset of uplink shared channel transmission occasions associated with the first TRP.

In some examples, the control signaling manager 855 may be configured as or otherwise support a means for receiving, via the control signaling, additional control signaling, or both, an indication of a set of carriers that support unlicensed communications, where the UCI message is transmitted via an additional carrier that is not included within the set of carriers.

In some examples, to support communicating with the network entity, the uplink shared channel communications manager 830 may be configured as or otherwise support a means for refraining from transmitting messages within a third uplink shared channel message that was not indicated as being unused by the UCI message.

In some examples, to support transmitting the UCI message, the UCI manager 835 may be configured as or otherwise support a means for transmitting, at a first time, a first UCI message including first information associated with unused uplink shared channel transmission occasions of the set of multiple uplink shared channel transmission occasions. In some examples, to support transmitting the UCI message, the UCI manager 835 may be configured as or otherwise support a means for transmitting, at a second time subsequent to the first time, a second UCI message including second information associated with unused uplink shared channel transmission occasions of the set of multiple uplink shared channel transmission occasions, where the first information, the second information, or both, indicates the second uplink shared channel transmission occasion, and where the second information overwrites the first information, or where the second information is the same as the first information.

Figure 9:
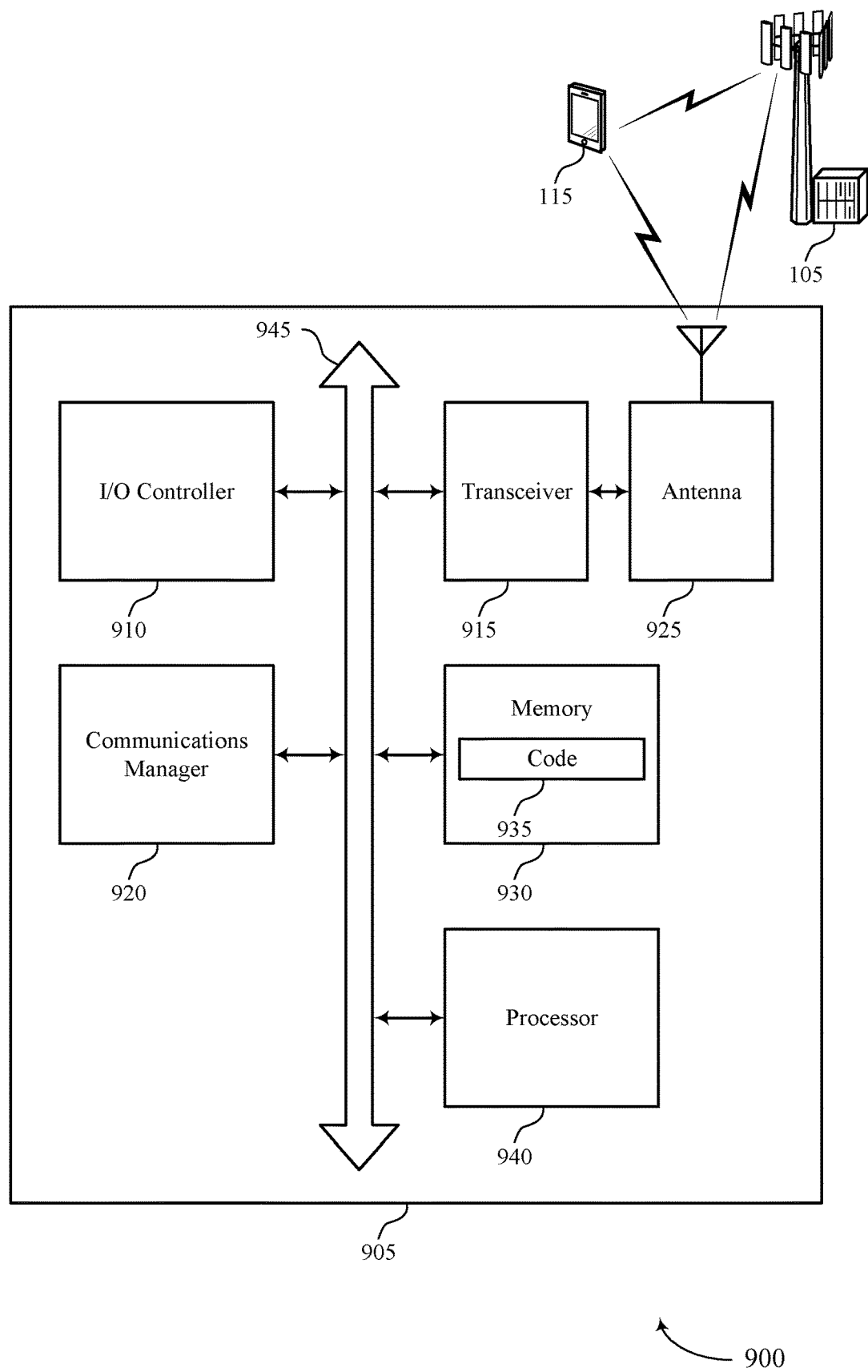
FIG. 9 illustrates a diagram of a system including a device that supports techniques for indicating unused CG-PUSCH occasions in accordance with various aspects of the present disclosure.

FIG. 9 illustrates a diagram of a system 900 including a device 905 that supports techniques for indicating unused CG-PUSCH occasions in accordance with various aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for indicating unused CG-PUSCH occasions). For example, the device 905 or a component of the device 905 may include a processor 940 and memory 930 coupled with or to the processor 940, the processor 940 and memory 930 configured to perform various functions described herein.

For example, the communications manager 920 may be configured as or otherwise support a means for receiving control signaling indicating an uplink configured grant including a set of multiple uplink shared channel transmission occasions within a period of the uplink configured grant usable by the UE. The communications manager 920 may be configured as or otherwise support a means for transmitting, in response to receiving the control signaling, an uplink shared channel message within a first uplink shared channel transmission occasion of the set of multiple uplink shared channel transmission occasions. The communications manager 920 may be configured as or otherwise support a means for transmitting a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both. The communications manager 920 may be configured as or otherwise support a means for communicating with a network entity based on transmitting the UCI message, where the communicating includes refraining from transmitting messages within the second uplink shared channel transmission occasion.

By including or configuring the communications manager 920 in accordance with examples as described herein, the device 905 may support techniques that enable UEs 115 to dynamically indicate which PUSCH occasions will go unused by the UE 115, either because of a lack of data to be transmitted within a message buffer at the UE 115, or because the unused PUSCH occasions conflict with other configured resources. As such, by enabling UEs 115 to dynamically indicate which PUSCH occasions will be unused, techniques described herein may enable the network to reallocate unused PUSCH occasions to other devices and/or for other types of communications. As such, techniques described herein may lead to more efficient resource utilization within a wireless communications system.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for indicating unused CG-PUSCH occasions as described herein, or the processor 940 and the memory 930 may be otherwise configured to perform or support such operations.

Figure 10:
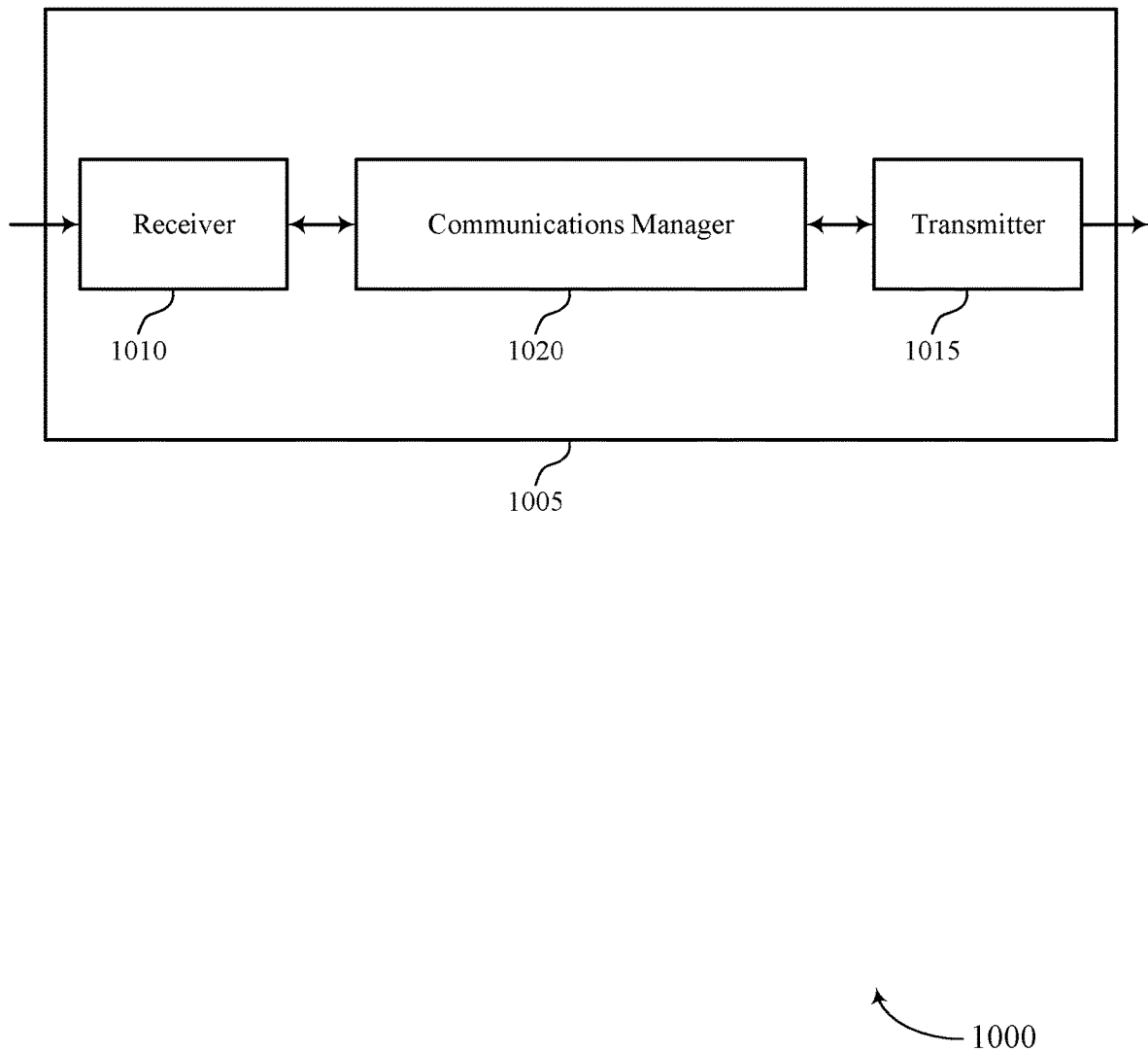
FIGS. 10 and 11 illustrate block diagrams of devices that support techniques for indicating unused CG-PUSCH occasions in accordance with various aspects of the present disclosure.

FIG. 10 illustrates a block diagram 1000 of a device 1005 that supports techniques for indicating unused CG-PUSCH occasions in accordance with various aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for indicating unused CG-PUSCH occasions as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

For example, the communications manager 1020 may be configured as or otherwise support a means for transmitting, to a UE, control signaling indicating an uplink configured grant including a set of multiple uplink shared channel transmission occasions within a period of the uplink configured grant usable by the UE. The communications manager 1020 may be configured as or otherwise support a means for receiving, in response to receiving the control signaling, an uplink shared channel message within a first uplink shared channel transmission occasion of the set of multiple uplink shared channel transmission occasions. The communications manager 1020 may be configured as or otherwise support a means for receiving a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both. The communications manager 1020 may be configured as or otherwise support a means for communicating with the UE based on transmitting the UCI message, where the communicating includes refraining from monitoring for messages within the second uplink shared channel transmission occasion.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques that enable UEs 115 to dynamically indicate which PUSCH occasions will go unused by the UE 115, either because of a lack of data to be transmitted within a message buffer at the UE 115, or because the unused PUSCH occasions conflict with other configured resources.

As such, by enabling UEs 115 to dynamically indicate which PUSCH occasions will be unused, techniques described herein may enable the network to reallocate unused PUSCH occasions to other devices and/or for other types of communications. As such, techniques described herein may lead to more efficient resource utilization within a wireless communications system.

Figure 11:
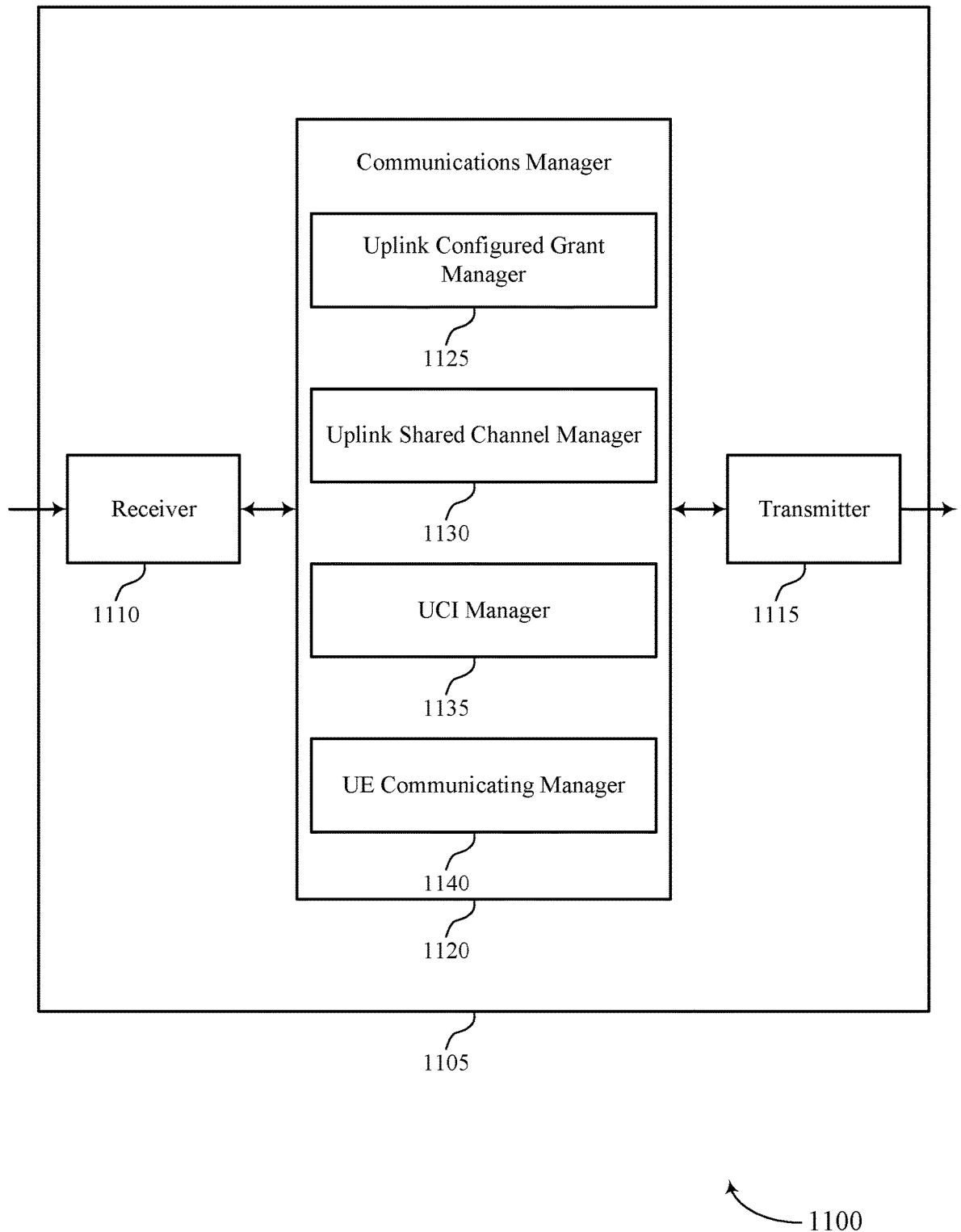

FIG. 11 illustrates a block diagram 1100 of a device 1105 that supports techniques for indicating unused CG-PUSCH occasions in accordance with various aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for indicating unused CG-PUSCH occasions as described herein. For example, the communications manager 1120 may include an uplink configured grant manager 1125, an uplink shared channel manager 1130, a UCI manager 1135, a UE communicating manager 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The uplink configured grant manager 1125 may be configured as or otherwise support a means for transmitting, to a UE, control signaling indicating an uplink configured grant including a set of multiple uplink shared channel transmission occasions within a period of the uplink configured grant usable by the UE. The uplink shared channel manager 1130 may be configured as or otherwise support a means for receiving, in response to receiving the control signaling, an uplink shared channel message within a first uplink shared channel transmission occasion of the set of multiple uplink shared channel transmission occasions. The UCI manager 1135 may be configured as or otherwise support a means for receiving a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both. The UE communicating manager 1140 may be configured as or otherwise support a means for communicating with the UE based on transmitting the UCI message, where the communicating includes refraining from monitoring for messages within the second uplink shared channel transmission occasion.

Figure 12:
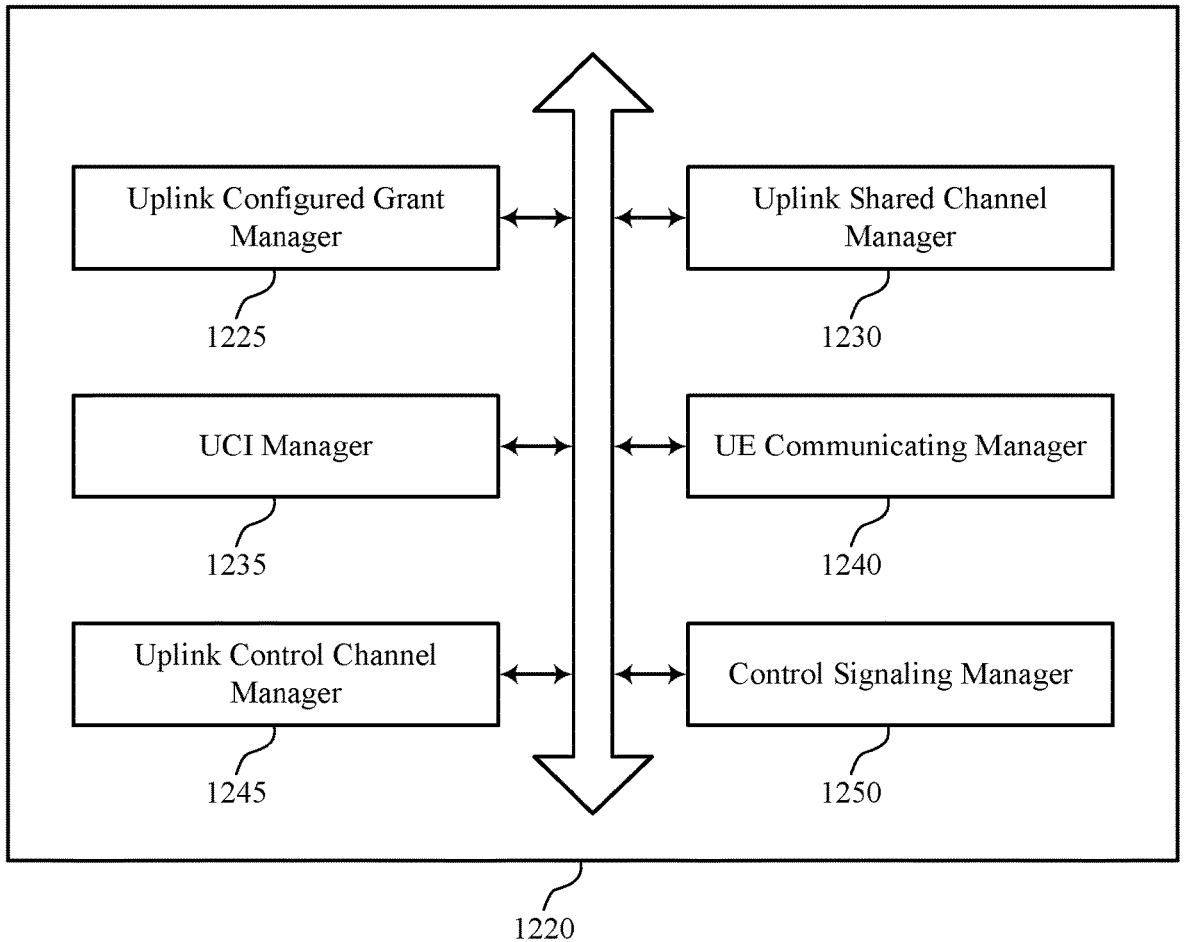
FIG. 12 illustrates a block diagram of a communications manager that supports techniques for indicating unused CG-PUSCH occasions in accordance with various aspects of the present disclosure.

FIG. 12 illustrates a block diagram 1200 of a communications manager 1220 that supports techniques for indicating unused CG-PUSCH occasions in accordance with various aspects of the present disclosure. The communications manager 1220 may be an example of aspects of a communications manager 1020, a communications manager 1120, or both, as described herein. The communications manager 1220, or various components thereof, may be an example of means for performing various aspects of techniques for indicating unused CG-PUSCH occasions as described herein. For example, the communications manager 1220 may include an uplink configured grant manager 1225, an uplink shared channel manager 1230, a UCI manager 1235, a UE communicating manager 1240, an uplink control channel manager 1245, a control signaling manager 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The uplink configured grant manager 1225 may be configured as or otherwise support a means for transmitting, to a UE, control signaling indicating an uplink configured grant including a set of multiple uplink shared channel transmission occasions within a period of the uplink configured grant usable by the UE. The uplink shared channel manager 1230 may be configured as or otherwise support a means for receiving, in response to receiving the control signaling, an uplink shared channel message within a first uplink shared channel transmission occasion of the set of multiple uplink shared channel transmission occasions. The UCI manager 1235 may be configured as or otherwise support a means for receiving a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both. The UE communicating manager 1240 may be configured as or otherwise support a means for communicating with the UE based on transmitting the UCI message, where the communicating includes refraining from monitoring for messages within the second uplink shared channel transmission occasion.

In some examples, to support communicating with the UE, the uplink control channel manager 1245 may be configured as or otherwise support a means for receiving an uplink control channel message that at least partially overlaps with the second uplink shared channel transmission occasion in a time domain, a frequency domain, or both.

In some examples, the control signaling manager 1250 may be configured as or otherwise support a means for transmitting, via the control signaling, additional control signaling, or both, a resource configuration including the set of reserved resources allocated for communications between the network entity and the UE, where receiving the UCI message is based on the second uplink shared channel transmission occasion overlapping with the set of reserved resources in a time domain, a frequency domain, or both.

In some examples, the set of reserved resources include a set of downlink symbols of a TDD configuration, a set of SSB resources, a CORESET, a search space, a set of CLI measurement resources, or any combination thereof.

In some examples, the UCI message is transmitted via an uplink control channel, via the set of multiple uplink shared channel transmission occasions, or both.

In some examples, to support receiving the UCI message, the UCI manager 1235 may be configured as or otherwise support a means for receiving the UCI message including a set of bit field values indicating a set of uplink shared channel transmission occasions including the second uplink shared channel transmission occasion will be unused, where the set of bit field values include a codepoint, a bitmap, or both.

In some examples, the control signaling manager 1250 may be configured as or otherwise support a means for transmitting, via the control signaling, additional control signaling, or both, a data object indicating a set of mappings between sets of uplink shared channel transmission occasions and corresponding sets of bit field values, where the set of bit field values corresponds to a mapping of the set of mappings that is associated with the set of uplink shared channel transmission occasions.

In some examples, to support receiving the UCI message, the UCI manager 1235 may be configured as or otherwise support a means for receiving the UCI message including a single bit field value indicating that a subsequent uplink shared channel transmission occasion following the UCI message will be unused, where the subsequent uplink shared channel transmission occasion includes the second uplink shared channel transmission occasion.

In some examples, to support receiving the UCI message, the UCI manager 1235 may be configured as or otherwise support a means for receiving the UCI message including a single bit field value indicating that all uplink shared channel transmission occasions of the set of multiple uplink shared channel transmission occasions following the UCI message will be unused.

In some examples, the control signaling manager 1250 may be configured as or otherwise support a means for transmitting, via the control signaling, an indication of a set of resources allocated for UCI messages indicating unused uplink shared channel transmission occasions, where the UCI messages is received within the set of resources.

In some examples, to support receiving the UCI message, the UCI manager 1235 may be configured as or otherwise support a means for receiving the UCI message prior to an earliest uplink shared channel transmission occasion of the set of multiple uplink shared channel transmission occasions, or within the earliest uplink shared channel transmission occasion.

In some examples, to support receiving the UCI message, the UCI manager 1235 may be configured as or otherwise support a means for receiving a set of multiple UCI messages within the set of multiple uplink shared channel transmission occasions, where each UCI message of the set of multiple UCI messages indicates one or more unused uplink shared channel transmission occasions.

In some examples, the control signaling manager 1250 may be configured as or otherwise support a means for transmitting, via the control signaling, an indication of one or more parameters associated with the UCI message, where the UCI message is received in accordance with the one or more parameters, and where the one or more parameters include a priority associated the UCI message, a control message format of associated with the UCI message, a condition for multiplexing the UCI message with other types of messages, an offset for transmitting the UCI message within an uplink shared channel transmission occasion of the set of multiple uplink shared channel transmission occasions, or any combination thereof.

In some examples, the control signaling manager 1250 may be configured as or otherwise support a means for transmitting, via the control signaling, additional control signaling, or both, an indication of a set of carriers that support unlicensed communications, where the UCI message is received via an additional carrier that is not included within the set of carriers.

In some examples, the control signaling manager 1250 may be configured as or otherwise support a means for transmitting, via the control signaling, additional control signaling, or both, an indication of a carrier that supports unlicensed communications, where the UCI message is received via the carrier, and where the UCI message is multiplexed with one or more messages associated with unlicensed communications between the UE and the network entity.

Figure 13:
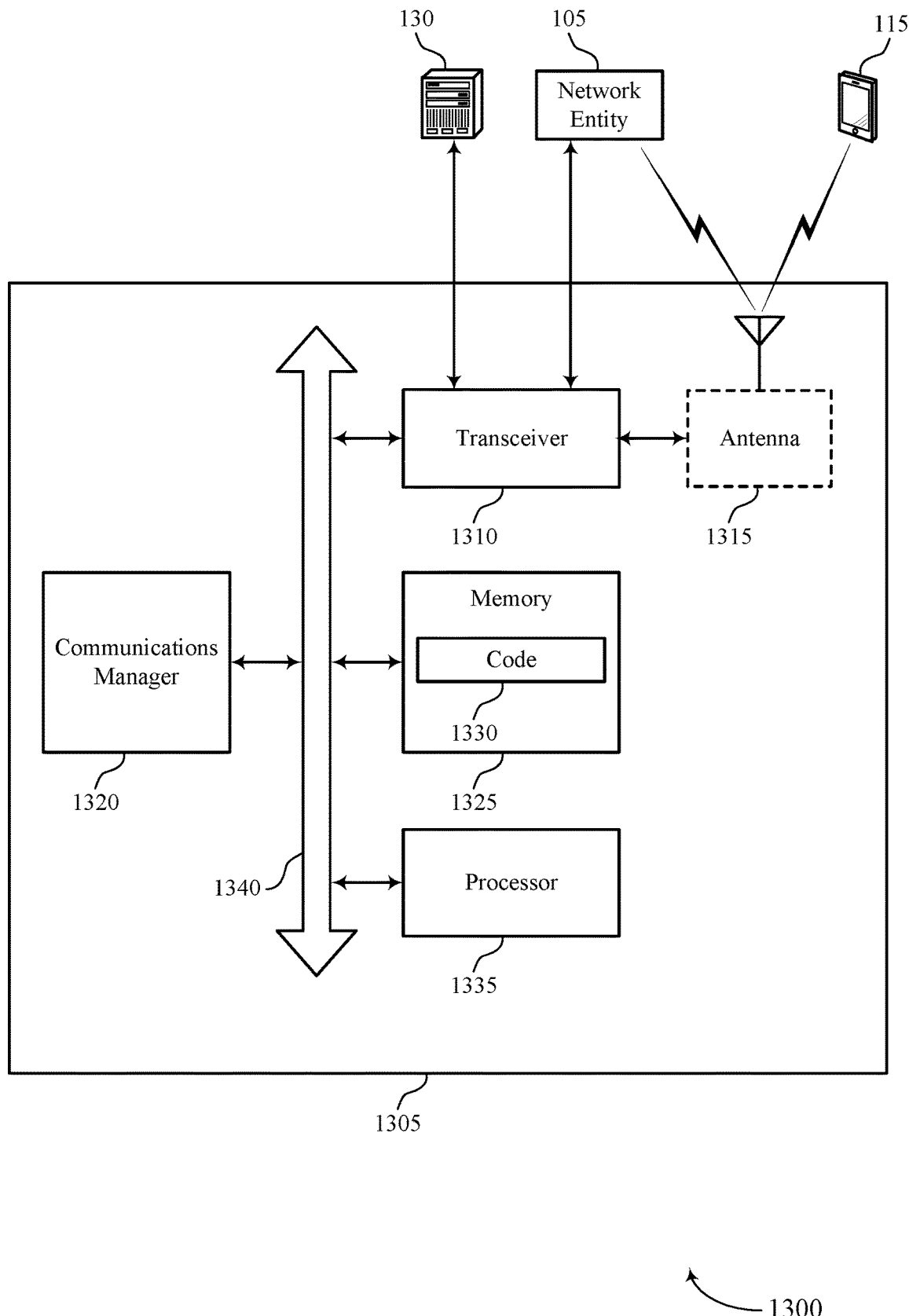
FIG. 13 illustrates a diagram of a system including a device that supports techniques for indicating unused CG-PUSCH occasions in accordance with various aspects of the present disclosure.

FIG. 13 illustrates a diagram of a system 1300 including a device 1305 that supports techniques for indicating unused CG-PUSCH occasions in accordance with various aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for indicating unused CG-PUSCH occasions). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

For example, the communications manager 1320 may be configured as or otherwise support a means for transmitting, to a UE, control signaling indicating an uplink configured grant including a set of multiple uplink shared channel transmission occasions within a period of the uplink configured grant usable by the UE. The communications manager 1320 may be configured as or otherwise support a means for receiving, in response to receiving the control signaling, an uplink shared channel message within a first uplink shared channel transmission occasion of the set of multiple uplink shared channel transmission occasions. The communications manager 1320 may be configured as or otherwise support a means for receiving a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both. The communications manager 1320 may be configured as or otherwise support a means for communicating with the UE based on transmitting the UCI message, where the communicating includes refraining from monitoring for messages within the second uplink shared channel transmission occasion.

By including or configuring the communications manager 1320 in accordance with examples as described herein, the device 1305 may support techniques that enable UEs 115 to dynamically indicate which PUSCH occasions will go unused by the UE 115, either because of a lack of data to be transmitted within a message buffer at the UE 115, or because the unused PUSCH occasions conflict with other configured resources. As such, by enabling UEs 115 to dynamically indicate which PUSCH occasions will be unused, techniques described herein may enable the network to reallocate unused PUSCH occasions to other devices and/or for other types of communications. As such, techniques described herein may lead to more efficient resource utilization within a wireless communications system.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of techniques for indicating unused CG-PUSCH occasions as described herein, or the processor 1335 and the memory 1325 may be otherwise configured to perform or support such operations.

Figure 14:
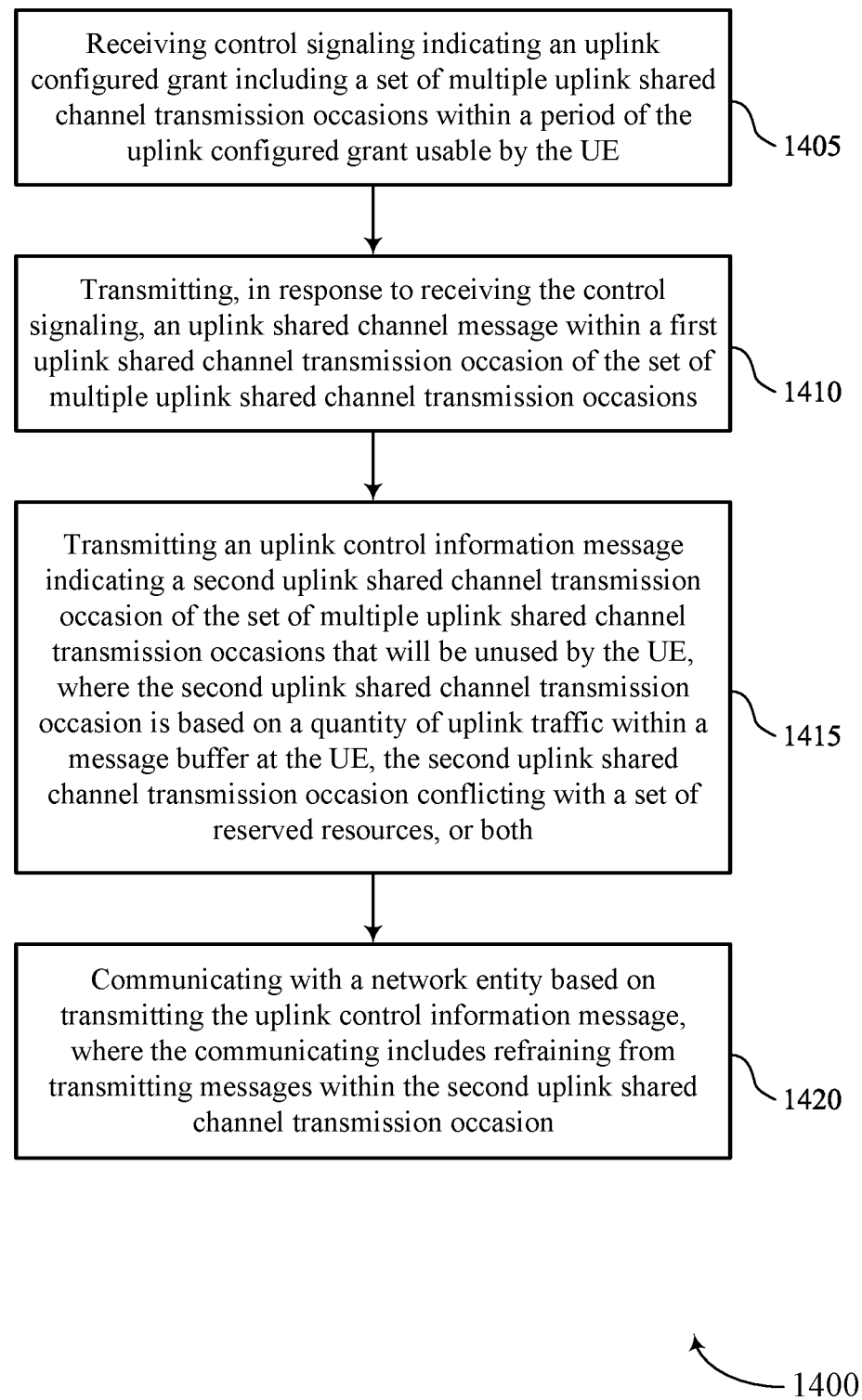
FIGS. 14 through 16 illustrate flowcharts showing methods that support techniques for indicating unused CG-PUSCH occasions in accordance with various aspects of the present disclosure.

FIG. 14 illustrates a flowchart showing a method 1400 that supports techniques for indicating unused CG-PUSCH occasions in accordance with various aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving control signaling indicating an uplink configured grant including a set of multiple uplink shared channel transmission occasions within a period of the uplink configured grant usable by the UE. The operations of 1405 may be performed in accordance with examples as disclosed herein. In some examples, aspects of the operations of 1405 may be performed by an uplink configured grant manager 825 as described with reference to FIG. 8.

At 1410, the method may include transmitting, in response to receiving the control signaling, an uplink shared channel message within a first uplink shared channel transmission occasion of the set of multiple uplink shared channel transmission occasions. The operations of 1410 may be performed in accordance with examples as disclosed herein. In some examples, aspects of the operations of 1410 may be performed by an uplink shared channel communications manager 830 as described with reference to FIG. 8.

At 1415, the method may include transmitting a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both. The operations of 1415 may be performed in accordance with examples as disclosed herein. In some examples, aspects of the operations of 1415 may be performed by a UCI manager 835 as described with reference to FIG. 8.

At 1420, the method may include communicating with a network entity based on transmitting the UCI message, where the communicating includes refraining from transmitting messages within the second uplink shared channel transmission occasion. The operations of 1420 may be performed in accordance with examples as disclosed herein. In some examples, aspects of the operations of 1420 may be performed by a network communications manager 840 as described with reference to FIG. 8.

Figure 15:
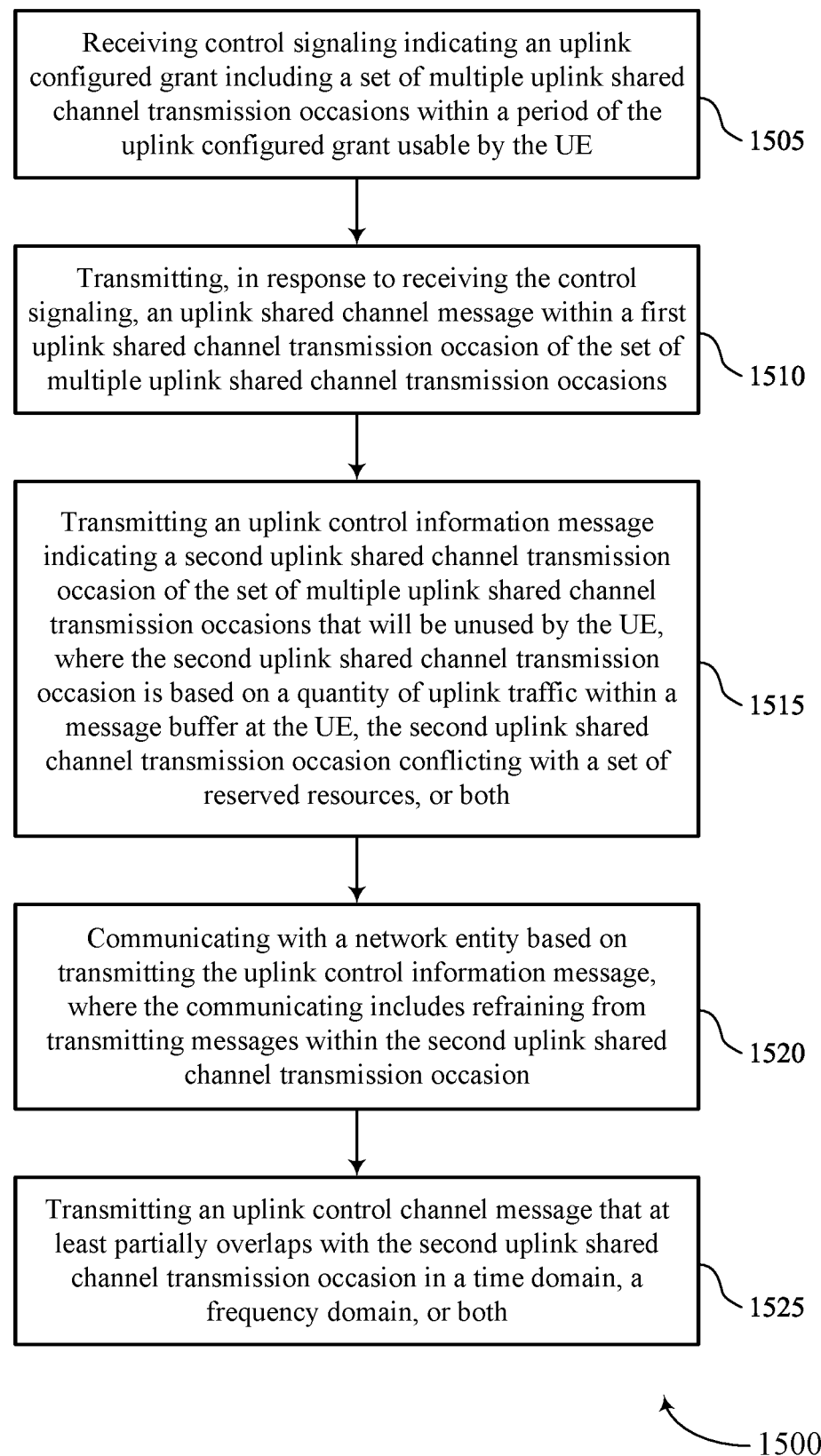

FIG. 15 illustrates a flowchart showing a method 1500 that supports techniques for indicating unused CG-PUSCH occasions in accordance with various aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving control signaling indicating an uplink configured grant including a set of multiple uplink shared channel transmission occasions within a period of the uplink configured grant usable by the UE. The operations of 1505 may be performed in accordance with examples as disclosed herein. In some examples, aspects of the operations of 1505 may be performed by an uplink configured grant manager 825 as described with reference to FIG. 8.

At 1510, the method may include transmitting, in response to receiving the control signaling, an uplink shared channel message within a first uplink shared channel transmission occasion of the set of multiple uplink shared channel transmission occasions. The operations of 1510 may be performed in accordance with examples as disclosed herein. In some examples, aspects of the operations of 1510 may be performed by an uplink shared channel communications manager 830 as described with reference to FIG. 8.

At 1515, the method may include transmitting a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both. The operations of 1515 may be performed in accordance with examples as disclosed herein. In some examples, aspects of the operations of 1515 may be performed by a UCI manager 835 as described with reference to FIG. 8.

At 1520, the method may include communicating with a network entity based on transmitting the UCI message, where the communicating includes refraining from transmitting messages within the second uplink shared channel transmission occasion. The operations of 1520 may be performed in accordance with examples as disclosed herein. In some examples, aspects of the operations of 1520 may be performed by a network communications manager 840 as described with reference to FIG. 8.

At 1525, the method may include transmitting an uplink control channel message that at least partially overlaps with the second uplink shared channel transmission occasion in a time domain, a frequency domain, or both. The operations of 1525 may be performed in accordance with examples as disclosed herein. In some examples, aspects of the operations of 1525 may be performed by an uplink control channel communications manager 845 as described with reference to FIG. 8.

Figure 16:
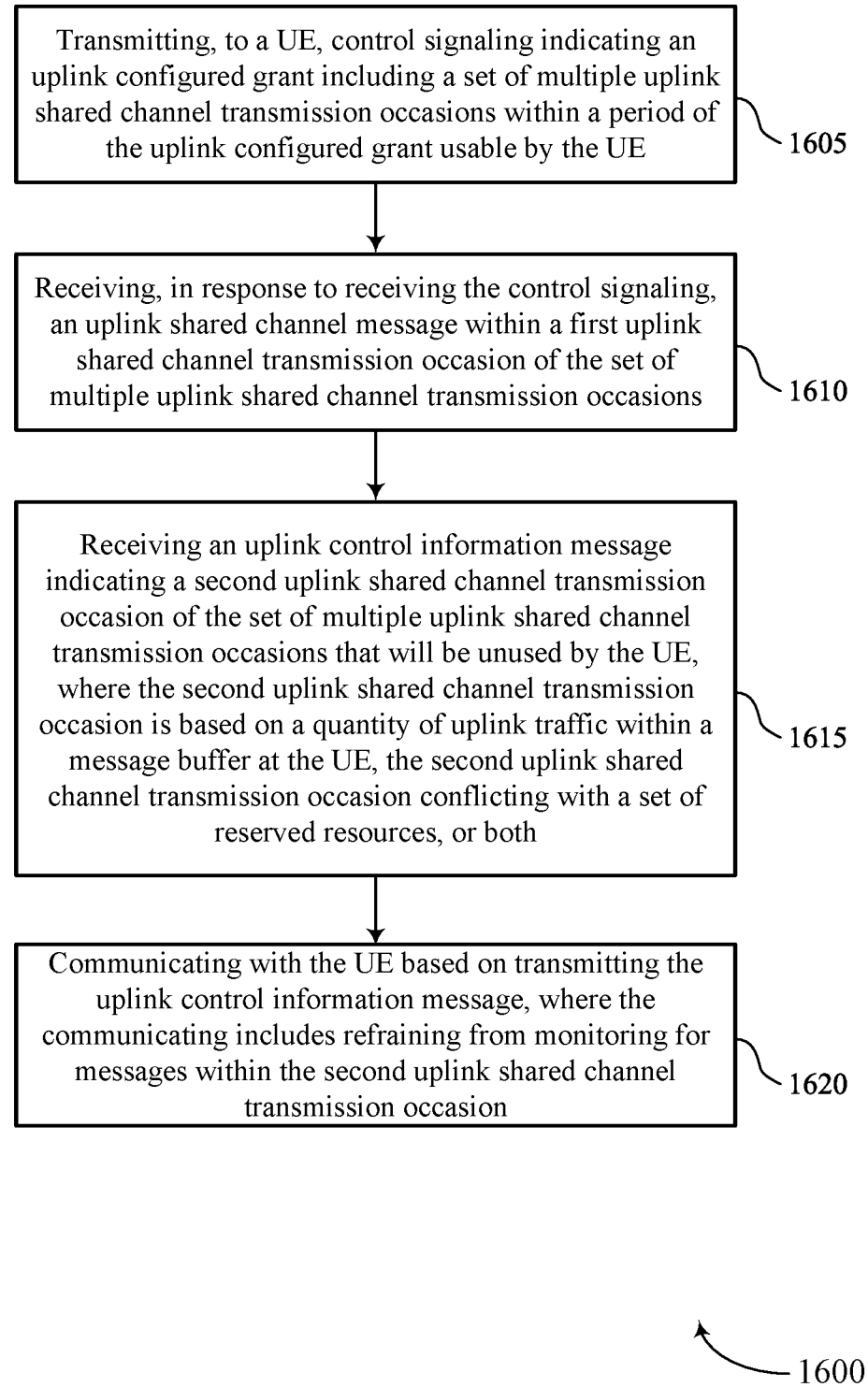

FIG. 16 illustrates a flowchart showing a method 1600 that supports techniques for indicating unused CG-PUSCH occasions in accordance with various aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, control signaling indicating an uplink configured grant including a set of multiple uplink shared channel transmission occasions within a period of the uplink configured grant usable by the UE. The operations of 1605 may be performed in accordance with examples as disclosed herein. In some examples, aspects of the operations of 1605 may be performed by an uplink configured grant manager 1225 as described with reference to FIG. 12.

At 1610, the method may include receiving, in response to receiving the control signaling, an uplink shared channel message within a first uplink shared channel transmission occasion of the set of multiple uplink shared channel transmission occasions. The operations of 1610 may be performed in accordance with examples as disclosed herein. In some examples, aspects of the operations of 1610 may be performed by an uplink shared channel manager 1230 as described with reference to FIG. 12.

At 1615, the method may include receiving a UCI message indicating a second uplink shared channel transmission occasion of the set of multiple uplink shared channel transmission occasions that will be unused by the UE, where the second uplink shared channel transmission occasion is based on a quantity of uplink traffic within a message buffer at the UE, the second uplink shared channel transmission occasion conflicting with a set of reserved resources, or both. The operations of 1615 may be performed in accordance with examples as disclosed herein. In some examples, aspects of the operations of 1615 may be performed by a UCI manager 1235 as described with reference to FIG. 12.

At 1620, the method may include communicating with the UE based on transmitting the UCI message, where the communicating includes refraining from monitoring for messages within the second uplink shared channel transmission occasion. The operations of 1620 may be performed in accordance with examples as disclosed herein. In some examples, aspects of the operations of 1620 may be performed by a UE communicating manager 1240 as described with reference to FIG. 12.

The following provides an overview of aspects of the present disclosure:

Aspect 1: A method for wireless communication at a UE, comprising: receiving control signaling indicating an uplink configured grant comprising a plurality of uplink shared channel transmission occasions within a period of the uplink configured grant usable by the UE; transmitting, in response to receiving the control signaling, an uplink shared channel message within a first uplink shared channel transmission occasion of the plurality of uplink shared channel transmission occasions; transmitting a UCI message indicating a second uplink shared channel transmission occasion of the plurality of uplink shared channel transmission occasions that will be unused by the UE, wherein the second uplink shared channel transmission occasion is based at least in part on a quantity of uplink traffic within a message buffer at the UE, the second uplink shared channel transmission occasion conflicting with a set of reserved resources, or both; and communicating with a network entity based at least in part on transmitting the UCI message, wherein the communicating comprises refraining from transmitting messages within the second uplink shared channel transmission occasion.

Aspect 2: The method of aspect 1, wherein communicating with the network entity comprises: transmitting an uplink control channel message that at least partially overlaps with the second uplink shared channel transmission occasion in a time domain, a frequency domain, or both.

Aspect 3: The method of any of aspects 1 through 2, further comprising: receiving, via the control signaling, additional control signaling, or both, a resource configuration comprising the set of reserved resources allocated for communications between the network entity and the UE; and identifying that the second uplink shared channel transmission occasion will be unused based at least in part on the second uplink shared channel transmission occasion overlapping with the set of reserved resources in a time domain, a frequency domain, or both, wherein transmitting the UCI message is based at least in part on the identifying.

Aspect 4: The method of aspect 3, wherein the set of reserved resources comprise a set of downlink symbols of a TDD configuration, a set of SSB resources, a CORESET, a search space, a set of cross-link interference measurement resources, or any combination thereof.

Aspect 5: The method of any of aspects 1 through 4, wherein the UCI message is transmitted via an uplink control channel, via the plurality of uplink shared channel transmission occasions, or both.

Aspect 6: The method of any of aspects 1 through 5, wherein transmitting the UCI message comprises: transmitting the UCI message comprising a set of bit field values indicating a set of uplink shared channel transmission occasions including the second uplink shared channel transmission occasion will be unused, wherein the set of bit field values comprise a codepoint, a bitmap, or both.

Aspect 7: The method of aspect 6, further comprising: receiving, via the control signaling, additional control signaling, or both, a data object indicating a set of mappings between sets of uplink shared channel transmission occasions and corresponding sets of bit field values, wherein the set of bit field values corresponds to a mapping of the set of mappings that is associated with the set of uplink shared channel transmission occasions.

Aspect 8: The method of any of aspects 1 through 7, wherein transmitting the UCI message comprises: transmitting the UCI message comprising a single bit field value indicating that a subsequent uplink shared channel transmission occasion following the UCI message will be unused, wherein the subsequent uplink shared channel transmission occasion comprises the second uplink shared channel transmission occasion.

Aspect 9: The method of any of aspects 1 through 8, wherein transmitting the UCI message comprises: transmitting the UCI message comprising a single bit field value indicating that all uplink shared channel transmission occasions of the plurality of uplink shared channel transmission occasions following the UCI message will be unused.

Aspect 10: The method of any of aspects 1 through 9, further comprising: receiving, via the control signaling, an indication of a set of resources allocated for UCI messages indicating unused uplink shared channel transmission occasions, wherein the UCI messages is transmitted within the set of resources.

Aspect 11: The method of any of aspects 1 through 10, wherein transmitting the UCI message comprises: transmitting the UCI message prior to an earliest uplink shared channel transmission occasion of the plurality of uplink shared channel transmission occasions, or within the earliest uplink shared channel transmission occasion.

Aspect 12: The method of any of aspects 1 through 11, wherein transmitting the UCI message comprises: transmitting a plurality of UCI messages within the plurality of uplink shared channel transmission occasions, wherein each UCI message of the plurality of UCI messages indicates one or more unused uplink shared channel transmission occasions.

Aspect 13: The method of any of aspects 1 through 12, further comprising: receiving, via the control signaling, an indication of one or more parameters associated with the UCI message, wherein the UCI message is transmitted in accordance with the one or more parameters, and wherein the one or more parameters comprise a priority associated with the UCI message, a control message format of associated with the UCI message, a condition for multiplexing the UCI message with other types of messages, an offset for transmitting the UCI message within an uplink shared channel transmission occasion of the plurality of uplink shared channel transmission occasions, or any combination thereof.

Aspect 14: The method of any of aspects 1 through 13, wherein the uplink configured grant indicates a first subset of uplink shared channel transmission occasions of the plurality of uplink shared channel transmission occasions associated with a first TRP, and a second subset of uplink shared channel transmission occasions of the plurality of uplink shared channel transmission occasions associated with a second TRP, the method further comprising: transmitting the UCI message to both the first TRP and the second TRP.

Aspect 15: The method of any of aspects 1 through 14, wherein the uplink configured grant indicates a first subset of uplink shared channel transmission occasions of the plurality of uplink shared channel transmission occasions associated with a first TRP, and a second subset of uplink shared channel transmission occasions of the plurality of uplink shared channel transmission occasions associated with a second TRP, the method further comprising: transmitting the UCI message only to the first TRP based at least in part on the second uplink shared channel transmission occasion being included within the first subset of uplink shared channel transmission occasions associated with the first TRP.

Aspect 16: The method of any of aspects 1 through 15, further comprising: receiving, via the control signaling, additional control signaling, or both, an indication of a set of carriers that support unlicensed communications, wherein the UCI message is transmitted via an additional carrier that is not included within the set of carriers.

Aspect 17: The method of any of aspects 1 through 16, wherein communicating with the network entity comprises: refraining from transmitting messages within a third uplink shared channel message that was not indicated as being unused by the UCI message.

Aspect 18: The method of any of aspects 1 through 17, wherein transmitting the UCI message comprises: transmitting, at a first time, a first UCI message including first information associated with unused uplink shared channel transmission occasions of the plurality of uplink shared channel transmission occasions; and transmitting, at a second time subsequent to the first time, a second UCI message including second information associated with unused uplink shared channel transmission occasions of the plurality of uplink shared channel transmission occasions, wherein the first information, the second information, or both, indicates the second uplink shared channel transmission occasion, and wherein the second information overwrites the first information, or wherein the second information is the same as the first information.

Aspect 19: A method for wireless communication at a network entity, comprising: transmitting, to a UE, control signaling indicating an uplink configured grant comprising a plurality of uplink shared channel transmission occasions within a period of the uplink configured grant usable by the UE; receiving, in response to receiving the control signaling, an uplink shared channel message within a first uplink shared channel transmission occasion of the plurality of uplink shared channel transmission occasions; receiving a UCI message indicating a second uplink shared channel transmission occasion of the plurality of uplink shared channel transmission occasions that will be unused by the UE, wherein the second uplink shared channel transmission occasion is based at least in part on a quantity of uplink traffic within a message buffer at the UE, the second uplink shared channel transmission occasion conflicting with a set of reserved resources, or both; and communicating with the UE based at least in part on transmitting the UCI message, wherein the communicating comprises refraining from monitoring for messages within the second uplink shared channel transmission occasion.

Aspect 20: The method of aspect 19, wherein communicating with the UE comprises: receiving an uplink control channel message that at least partially overlaps with the second uplink shared channel transmission occasion in a time domain, a frequency domain, or both.

Aspect 21: The method of any of aspects 19 through 20, further comprising: transmitting, via the control signaling, additional control signaling, or both, a resource configuration comprising the set of reserved resources allocated for communications between the network entity and the UE, wherein receiving the UCI message is based at least in part on the second uplink shared channel transmission occasion overlapping with the set of reserved resources in a time domain, a frequency domain, or both.

Aspect 22: The method of aspect 21, wherein the set of reserved resources comprise a set of downlink symbols of a TDD configuration, a set of SSB resources, a CORESET, a search space, a set of cross-link interference measurement resources, or any combination thereof.

Aspect 23: The method of any of aspects 19 through 22, wherein the UCI message is transmitted via an uplink control channel, via the plurality of uplink shared channel transmission occasions, or both.

Aspect 24: The method of any of aspects 19 through 23, wherein receiving the UCI message comprises: receiving the UCI message comprising a set of bit field values indicating a set of uplink shared channel transmission occasions including the second uplink shared channel transmission occasion will be unused, wherein the set of bit field values comprise a codepoint, a bitmap, or both.

Aspect 25: The method of aspect 24, further comprising: transmitting, via the control signaling, additional control signaling, or both, a data object indicating a set of mappings between sets of uplink shared channel transmission occasions and corresponding sets of bit field values, wherein the set of bit field values corresponds to a mapping of the set of mappings that is associated with the set of uplink shared channel transmission occasions.

Aspect 26: The method of any of aspects 19 through 25, wherein receiving the UCI message comprises: receiving the UCI message comprising a single bit field value indicating that a subsequent uplink shared channel transmission occasion following the UCI message will be unused, wherein the subsequent uplink shared channel transmission occasion comprises the second uplink shared channel transmission occasion.

Aspect 27: The method of any of aspects 19 through 26, wherein receiving the UCI message comprises: receiving the UCI message comprising a single bit field value indicating that all uplink shared channel transmission occasions of the plurality of uplink shared channel transmission occasions following the UCI message will be unused.

Aspect 28: The method of any of aspects 19 through 27, further comprising: transmitting, via the control signaling, an indication of a set of resources allocated for UCI messages indicating unused uplink shared channel transmission occasions, wherein the UCI messages is received within the set of resources.

Aspect 29: The method of any of aspects 19 through 28, wherein receiving the UCI message comprises: receiving the UCI message prior to an earliest uplink shared channel transmission occasion of the plurality of uplink shared channel transmission occasions, or within the earliest uplink shared channel transmission occasion.

Aspect 30: The method of any of aspects 19 through 29, wherein receiving the UCI message comprises: receiving a plurality of UCI messages within the plurality of uplink shared channel transmission occasions, wherein each UCI message of the plurality of UCI messages indicates one or more unused uplink shared channel transmission occasions.

Aspect 31: The method of any of aspects 19 through 30, further comprising: transmitting, via the control signaling, an indication of one or more parameters associated with the UCI message, wherein the UCI message is received in accordance with the one or more parameters, and wherein the one or more parameters comprise a priority associated the UCI message, a control message format of associated with the UCI message, a condition for multiplexing the UCI message with other types of messages, an offset for transmitting the UCI message within an uplink shared channel transmission occasion of the plurality of uplink shared channel transmission occasions, or any combination thereof.

Aspect 32: The method of any of aspects 19 through 31, further comprising: transmitting, via the control signaling, additional control signaling, or both, an indication of a set of carriers that support unlicensed communications, wherein the UCI message is received via an additional carrier that is not included within the set of carriers.

Aspect 33: The method of any of aspects 19 through 32, further comprising: transmitting, via the control signaling, additional control signaling, or both, an indication of a carrier that supports unlicensed communications, wherein the UCI message is received via the carrier, and wherein the UCI message is multiplexed with one or more messages associated with unlicensed communications between the UE and the network entity.

Aspect 34: An apparatus comprising a processor; memory coupled with the processor; and instructions stored in the memory and executable by the processor to cause the apparatus to perform a method of any of aspects 1 through 18.

Aspect 35: An apparatus comprising at least one means for performing a method of any of aspects 1 through 18.

Aspect 36: A non-transitory computer-readable medium storing code the code comprising instructions executable by a processor to perform a method of any of aspects 1 through 18.

Aspect 37: An apparatus comprising a processor; memory coupled with the processor; and instructions stored in the memory and executable by the processor to cause the apparatus to perform a method of any of aspects 19 through 33.

Aspect 38: An apparatus comprising at least one means for performing a method of any of aspects 19 through 33.

Aspect 39: A non-transitory computer-readable medium storing code the code comprising instructions executable by a processor to perform a method of any of aspects 19 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor;
   one or more memories coupled with the processor; and
   instructions stored in the one or more memories and executable by the processor to cause the apparatus to:

receive control signaling indicating an uplink configured grant comprising a plurality of uplink shared channel transmission occasions within a period of the uplink configured grant usable by the UE, wherein the uplink configured grant indicates a first subset of uplink shared channel transmission occasions of the plurality of uplink shared channel transmission occasions associated with a first transmission-reception point, and a second subset of uplink shared channel transmission occasions of the plurality of uplink shared channel transmission occasions associated with a second transmission-reception point;

transmit, in response to receiving the control signaling, an uplink shared channel message within a first uplink shared channel transmission occasion of the plurality of uplink shared channel transmission occasions;

transmit, to both the first transmission-reception point and the second transmission-reception point, an uplink control information message indicating a second uplink shared channel transmission occasion of the plurality of uplink shared channel transmission occasions that will be unused by the UE, wherein the second uplink shared channel transmission occasion is based at least in part on a quantity of uplink traffic within a message buffer at the UE, the second uplink shared channel transmission occasion conflicting with a set of reserved resources, or both; and communicate with a network entity based at least in part on transmitting the uplink control information message, wherein the communicating comprises refraining from transmitting messages within the second uplink shared channel transmission occasion.

2. The apparatus of claim 1, wherein the instructions to communicate with the network entity are executable by the processor to cause the apparatus to:
transmit an uplink control channel message that at least partially overlaps with the second uplink shared channel transmission occasion in a time domain, a frequency domain, or both.

3. The apparatus of claim 1, wherein the instructions are further executable by the processor to cause the apparatus to:
receive, via the control signaling, additional control signaling, or both, a resource configuration comprising the set of reserved resources allocated for communications between the network entity and the UE; and
identify that the second uplink shared channel transmission occasion will be unused based at least in part on the second uplink shared channel transmission occasion overlapping with the set of reserved resources in a time domain, a frequency domain, or both, wherein transmitting the uplink control information message is based at least in part on the identifying.

4. The apparatus of claim 3, wherein the set of reserved resources comprise a set of downlink symbols of a time division duplexing configuration, a set of synchronization signal block resources, a control resource set, a search space, a set of cross-link interference measurement resources, or any combination thereof.

5. The apparatus of claim 1, wherein the uplink control information message is transmitted via an uplink control channel, via the plurality of uplink shared channel transmission occasions, or both.

6. The apparatus of claim 1, wherein the instructions to transmit the uplink control information message are executable by the processor to cause the apparatus to:

transmit the uplink control information message comprising a set of bit field values indicating a set of uplink shared channel transmission occasions including the second uplink shared channel transmission occasion will be unused, wherein the set of bit field values comprise a codepoint, a bitmap, or both.

7. The apparatus of claim 6, wherein the instructions are further executable by the processor to cause the apparatus to:
receive, via the control signaling, additional control signaling, or both, a data object indicating a set of mappings between sets of uplink shared channel transmission occasions and corresponding sets of bit field values, wherein the set of bit field values corresponds to a mapping of the set of mappings that is associated with the set of uplink shared channel transmission occasions.

8. The apparatus of claim 1, wherein the instructions to transmit the uplink control information message are executable by the processor to cause the apparatus to:
transmit the uplink control information message comprising a single bit field value indicating that a subsequent uplink shared channel transmission occasion following the uplink control information message will be unused, wherein the subsequent uplink shared channel transmission occasion comprises the second uplink shared channel transmission occasion.

9. The apparatus of claim 1, wherein the instructions to transmit the uplink control information message are executable by the processor to cause the apparatus to:
transmit the uplink control information message comprising a single bit field value indicating that all uplink shared channel transmission occasions of the plurality of uplink shared channel transmission occasions following the uplink control information message will be unused.

10. The apparatus of claim 1, wherein the instructions are further executable by the processor to cause the apparatus to:
receive, via the control signaling, an indication of a set of resources allocated for uplink control information messages indicating unused uplink shared channel transmission occasions, wherein the uplink control information messages is transmitted within the set of resources.

11. The apparatus of claim 1, wherein the instructions to transmit the uplink control information message are executable by the processor to cause the apparatus to:
transmit the uplink control information message prior to an earliest uplink shared channel transmission occasion of the plurality of uplink shared channel transmission occasions, or within the earliest uplink shared channel transmission occasion.

12. The apparatus of claim 1, wherein the instructions to transmit the uplink control information message are executable by the processor to cause the apparatus to:
transmit a plurality of uplink control information messages within the plurality of uplink shared channel transmission occasions, wherein each uplink control information message of the plurality of uplink control information messages indicates one or more unused uplink shared channel transmission occasions.

13. The apparatus of claim 1, wherein the instructions are further executable by the processor to cause the apparatus to:
receive, via the control signaling, an indication of one or more parameters associated with the uplink control information message, wherein the uplink control information message is transmitted in accordance with the one or more parameters, and wherein the one or more parameters comprise a priority associated the uplink control information message, a control message format of associated with the uplink control information message, a condition for multiplexing the uplink control information message with other types of messages, an offset for transmitting the uplink control information message within an uplink shared channel transmission occasion of the plurality of uplink shared channel transmission occasions, or any combination thereof.

14. The apparatus of claim 1, wherein the uplink configured grant indicates a first subset of uplink shared channel transmission occasions of the plurality of uplink shared channel transmission occasions associated with a first transmission-reception point, and a second subset of uplink shared channel transmission occasions of the plurality of uplink shared channel transmission occasions associated with a second transmission-reception point, wherein the instructions are further executable by the processor to cause the apparatus to:
  transmit the uplink control information message only to the first transmission-reception point based at least in part on the second uplink shared channel transmission occasion being included within the first subset of uplink shared channel transmission occasions associated with the first transmission-reception point.

15. The apparatus of claim 1, wherein the instructions are further executable by the processor to cause the apparatus to:
  receive, via the control signaling, additional control signaling, or both, an indication of a set of carriers that support unlicensed communications, wherein the uplink control information message is transmitted via an additional carrier that is not included within the set of carriers.

16. The apparatus of claim 1, wherein the instructions to communicate with the network entity are executable by the processor to cause the apparatus to:
  refrain from transmitting messages within a third uplink shared channel message that was not indicated as being unused by the uplink control information message.

17. The apparatus of claim 1, wherein the instructions to transmit the uplink control information message are executable by the processor to cause the apparatus to:
  transmit, at a first time, a first uplink control information message including first information associated with unused uplink shared channel transmission occasions of the plurality of uplink shared channel transmission occasions; and
  transmit, at a second time subsequent to the first time, a second uplink control information message including second information associated with unused uplink shared channel transmission occasions of the plurality of uplink shared channel transmission occasions, wherein the first information, the second information, or both, indicates the second uplink shared channel transmission occasion, and wherein the second information overwrites the first information, or wherein the second information is the same as the first information.

18. An apparatus for wireless communication at a network entity, comprising:
  a processor;
  one or more memories coupled with the processor; and
  instructions stored in the one or more memories and executable by the processor to cause the apparatus to:
    transmit, to a user equipment (UE), control signaling indicating an uplink configured grant comprising a plurality of uplink shared channel transmission occasions within a period of the uplink configured grant usable by the UE;
    receive, in response to receiving the control signaling, an uplink shared channel message within a first uplink shared channel transmission occasion of the plurality of uplink shared channel transmission occasions;
    receive an uplink control information message comprising a set of bit field values indicating a set of uplink shared channel transmission occasions including a second uplink shared channel transmission occasion of the plurality of uplink shared channel transmission occasions that will be unused by the UE, wherein the set of bit field values comprise a codepoint, a bitmap, or both, wherein the second uplink shared channel transmission occasion is based at least in part on a quantity of uplink traffic within a message buffer at the UE, the second uplink shared channel transmission occasion conflicting with a set of reserved resources, or both;
    transmit, via the control signaling, additional control signaling, or both, a data object indicating a set of mappings between sets of uplink shared channel transmission occasions and corresponding sets of bit field values, wherein the set of bit field values corresponds to a mapping of the set of mappings that is associated with the set of uplink shared channel transmission occasions; and
    communicate with the UE based at least in part on transmitting the uplink control information message, wherein the communicating comprises refraining from monitoring for messages within the second uplink shared channel transmission occasion.

19. The apparatus of claim 18, wherein the instructions to communicate with the UE are executable by the processor to cause the apparatus to:
  receive an uplink control channel message that at least partially overlaps with the second uplink shared channel transmission occasion in a time domain, a frequency domain, or both.

20. The apparatus of claim 18, wherein the instructions are further executable by the processor to cause the apparatus to:
  transmit, via the control signaling, additional control signaling, or both, a resource configuration comprising the set of reserved resources allocated for communications between the network entity and the UE, wherein receiving the uplink control information message is based at least in part on the second uplink shared channel transmission occasion overlapping with the set of reserved resources in a time domain, a frequency domain, or both.

21. The apparatus of claim 20, wherein the set of reserved resources comprise a set of downlink symbols of a time division duplexing configuration, a set of synchronization signal block resources, a control resource set, a search space, a set of cross-link interference measurement resources, or any combination thereof.

22. The apparatus of claim 18, wherein the uplink control information message is transmitted via an uplink control channel, via the plurality of uplink shared channel transmission occasions, or both.

23. The apparatus of claim 18, wherein the instructions to receive the uplink control information message are executable by the processor to cause the apparatus to:
  receive the uplink control information message comprising a single bit field value indicating that a subsequent uplink shared channel transmission occasion following the uplink control information message will be unused, wherein the subsequent uplink shared channel transmission occasion comprises the second uplink shared channel transmission occasion.

24. The apparatus of claim 18, wherein the instructions to receive the uplink control information message are executable by the processor to cause the apparatus to:

receive the uplink control information message comprising a single bit field value indicating that all uplink shared channel transmission occasions of the plurality of uplink shared channel transmission occasions following the uplink control information message will be unused.

25. The apparatus of claim 18, wherein the instructions are further executable by the processor to cause the apparatus to:

transmit, via the control signaling, an indication of a set of resources allocated for uplink control information messages indicating unused uplink shared channel transmission occasions, wherein the uplink control information messages is received within the set of resources.

26. A method for wireless communication at a user equipment (UE), comprising:

receiving control signaling indicating an uplink configured grant comprising a plurality of uplink shared channel transmission occasions within a period of the uplink configured grant usable by the UE, wherein the uplink configured grant indicates a first subset of uplink shared channel transmission occasions of the plurality of uplink shared channel transmission occasions associated with a first transmission-reception point, and a second subset of uplink shared channel transmission occasions of the plurality of uplink shared channel transmission occasions associated with a second transmission-reception point;

transmitting, in response to receiving the control signaling, an uplink shared channel message within a first uplink shared channel transmission occasion of the plurality of uplink shared channel transmission occasions;

transmitting, to both the first transmission-reception point and the second transmission-reception point, an uplink control information message indicating a second uplink shared channel transmission occasion of the plurality of uplink shared channel transmission occasions that will be unused by the UE, wherein the second uplink shared channel transmission occasion is based at least in part on a quantity of uplink traffic within a message buffer at the UE, the second uplink shared channel transmission occasion conflicting with a set of reserved resources, or both; and communicating with a network entity based at least in part on transmitting the uplink control information message, wherein the communicating comprises refraining from transmitting messages within the second uplink shared channel transmission occasion.

27. A method for wireless communication at a network entity, comprising:

transmitting, to a user equipment (UE), control signaling indicating an uplink configured grant comprising a plurality of uplink shared channel transmission occasions within a period of the uplink configured grant usable by the UE;

receiving, in response to receiving the control signaling, an uplink shared channel message within a first uplink shared channel transmission occasion of the plurality of uplink shared channel transmission occasions;

receiving an uplink control information message comprising a set of bit field values indicating a set of uplink shared channel transmission occasions including a second uplink shared channel transmission occasion of the plurality of uplink shared channel transmission occasions that will be unused by the UE, wherein the set of bit field values comprise a codepoint, a bitmap, or both, wherein the second uplink shared channel transmission occasion is based at least in part on a quantity of uplink traffic within a message buffer at the UE, the second uplink shared channel transmission occasion conflicting with a set of reserved resources, or both;

transmitting, via the control signaling, additional control signaling, or both, a data object indicating a set of mappings between sets of uplink shared channel transmission occasions and corresponding sets of bit field values, wherein the set of bit field values corresponds to a mapping of the set of mappings that is associated with the set of uplink shared channel transmission occasions; and communicating with the UE based at least in part on transmitting the uplink control information message, wherein the communicating comprises refraining from monitoring for messages within the second uplink shared channel transmission occasion.

\* \* \* \* \*